United States Patent
Song et al.

(10) Patent No.: US 9,755,967 B2
(45) Date of Patent: Sep. 5, 2017

(54) METHOD, APPARATUS, AND SYSTEM FOR CONFIGURING FLOW TABLE IN OPENFLOW NETWORK

(71) Applicant: Huawei Technologies Co., Ltd., Shenzhen (CN)

(72) Inventors: Kunpeng Song, Hangzhou (CN); Jixian Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 14/856,751

(22) Filed: Sep. 17, 2015

(65) Prior Publication Data
US 2016/0006650 A1    Jan. 7, 2016

Related U.S. Application Data

(63) Continuation of application No. PCT/CN2013/087563, filed on Nov. 21, 2013.

(30) Foreign Application Priority Data

Mar. 28, 2013    (CN) .......................... 2013 1 0105392

(51) Int. Cl.
*H04L 12/741*    (2013.01)
*H04L 12/64*    (2006.01)
(Continued)

(52) U.S. Cl.
CPC .......... *H04L 45/54* (2013.01); *H04L 12/6418* (2013.01); *H04L 41/0806* (2013.01); *H04L 45/02* (2013.01)

(58) Field of Classification Search
CPC . H04L 45/54; H04L 12/6418; H04L 41/0806; H04L 45/02
See application file for complete search history.

(56) References Cited

U.S. PATENT DOCUMENTS

2011/0261825 A1    10/2011 Ichino
2012/0099591 A1    4/2012 Kotha et al.
(Continued)

FOREIGN PATENT DOCUMENTS

CN    102349268 A    2/2012
CN    102549970 A    7/2012
(Continued)

OTHER PUBLICATIONS

Wendong, W., et al., "Autonomicity Design in OpenFlow Based Software Defined Networking," GC Workshop: The 4th IEEE International Workshop on Management of Emerging Networks and Services, Dec. 3, 2012, pp. 818-823.
"OpenFlow Switch Specification," Open Networking Foundation, Version 1.3.1, Wire Protocol 0x04, Retrieved from the Internet: URL:https://www.opennetworking.org/images/stories/downloads/sdn-resources/onf-specifications/openflow/openflow-spec-v1.3.1.pdf, Sep. 6, 2012, 128 pages.
(Continued)

Primary Examiner — Jae Y Lee
(74) Attorney, Agent, or Firm — Conley Rose, P.C.

(57) ABSTRACT

A method, an apparatus, and a system for configuring a flow table in an OpenFlow network, which can enhance a service switchover adaptation capability of a network system, and improve the working efficiency. The method includes determining, by a control device, a type of a service needing to be forwarded by a switch device; determining, according to the type of the service needing to be forwarded by the switch device and a prestored correspondence between a service type and flow table matching capability information, flow table matching capability information corresponding to the service type, and sending a flow table configuration message to the switch device, where the flow table configuration message carries the flow table matching capability information corresponding to the service type, so that the switch device configures, according to the flow table matching capability information, a flow table required for the service type.

11 Claims, 14 Drawing Sheets

Receive a flow table configuration message sent by a control device, where the flow table configuration message carries flow table matching capability information corresponding to a type of a service needing to be forwarded by a switch device — 201

Configure, in the switch device according to the flow table matching capability information corresponding to the type of the service needing to be forwarded by the switch device, a flow table corresponding to the type of the service needing to be forwarded by the switch device — 202

(51) Int. Cl.
*H04L 12/24* (2006.01)
*H04L 12/751* (2013.01)

(56) References Cited

U.S. PATENT DOCUMENTS

| | | | |
|---|---|---|---|
| 2012/0155467 A1* | 6/2012 | Appenzeller | H04L 45/54 370/392 |
| 2012/0195187 A1 | 8/2012 | Ashihara et al. | |
| 2013/0114615 A1 | 5/2013 | Suemitsu et al. | |

FOREIGN PATENT DOCUMENTS

| | | |
|---|---|---|
| CN | 102710432 A | 10/2012 |
| CN | 102857416 A | 1/2013 |
| CN | 102859952 A | 1/2013 |
| WO | 2012130264 A1 | 10/2012 |

OTHER PUBLICATIONS

Foreign Communication From a Counterpart Application, European Application No. 13879969.7, Extended European Search Report dated Feb. 12, 2016, 7 pages.
"OpenFlow Switch Specification," Version 1.2, Wire Protocol 0x03, Dec. 5, 2011, 82 pages.
Foreign Communication From a Counterpart Application, PCT Application No. PCT/CN2013/087563, English Translation of International Search Report dated Feb. 20, 2014, 2 pages.
Foreign Communication From a Counterpart Application, PCT Application No. PCT/CN2013/087563, English Translation of Written Opinion dated Feb. 20, 2014, 8 pages.
Partial English Translation and Abstract of Chinese Patent Application No. CN102857416, Dec. 8, 2016, 31 pages.
Foreign Communication From a Counterpart Application, Chinese Application No. 201310105392.3, Chinese Office Action dated Nov. 2, 2016, 9 pages.

* cited by examiner

METHOD, APPARATUS, AND SYSTEM FOR CONFIGURING FLOW TABLE IN OPENFLOW NETWORK

CROSS-REFERENCE TO RELATED APPLICATIONS

This application is a continuation of International Application No. PCT/CN2013/087563, filed on Nov. 21, 2013, which claims priority to Chinese Patent Application No. 201310105392.3, filed on Mar. 28, 2013, both of which are hereby incorporated by reference in their entireties.

TECHNICAL FIELD

The present disclosure relates to the field of communications, and in particular, to a method, an apparatus, and a system for configuring a flow table in an OpenFlow network.

BACKGROUND

With the development of communications technologies, innovation of the network field steps far behind that of the server end, and a user requires that the network be configured more rapidly and conveniently; therefore, people starts to focus on a programmable network, and a software defined network (SDN) emerges.

The SDN refers to an open environment derived from a conventional closed network, in which programming can be implemented just like a computer; an easily managed network virtualization layer is created, network control is decoupled from physical infrastructure, and a third party develops a network application program to control running of the network. The OpenFlow technology is one manner of implementing the SDN, and can enable users themselves to define traffic and decide a transmission path of the traffic in the network.

An OpenFlow network formed based on the OpenFlow technology includes an OpenFlow controller and an OpenFlow switch. The OpenFlow switch is a core component, and includes three parts, namely, the OpenFlow protocol, a secure channel, and a flow table.

According to the OpenFlow protocol, when establishing a connection to the controller, the OpenFlow switch needs to report a capability of the switch to the controller, where the capability includes the number of flow table levels currently supported by the switch, the number of entries in each level of flow table, and a flow table match field type in each level of flow table. The controller formulates a flow rule of the switch according to the capability report of the switch, and delivers the flow rule to the flow table of the switch. However, if an application scenario of the switch changes, and consequently a type of a service needing to be forwarded by the switch device changes and therefore a flow table match field supported by the switch cannot satisfy the changed service type, the controller cannot generate a corresponding flow rule, and further cannot implement a corresponding forwarding service. When the application scenario of the switch changes, the OpenFlow switch is disconnected from the network, and software and even hardware of the switch are re-configured; then, the switch re-accesses the switch network, and re-establishes a connection to the controller; and finally, the controller generates a corresponding flow rule to implement a corresponding forwarding service.

With this method, although normal service forwarding can be finally implemented when an application scenario of a switch changes, the OpenFlow switch must be disconnected from the network to implement the service forwarding; therefore, a service switchover adaptation capability of the entire network system is poor, affecting the working efficiency.

SUMMARY

Embodiments of the present disclosure provide a method, an apparatus, and a system for configuring a flow table in an OpenFlow network, which can support dynamic configuration of a flow table, enhance a service switchover adaptation capability of a network system, and improve the working efficiency.

In order to achieve the foregoing objectives, the following technical solutions are used in the embodiments of the present disclosure.

According to a first aspect, an embodiment of the present disclosure provides a method for configuring a flow table in an OpenFlow network, where the method is based on an OpenFlow protocol control device, and the method includes determining a type of a service needing to be forwarded by a switch device, determining, according to the type of the service needing to be forwarded by the switch device and a prestored correspondence between a service type and flow table matching capability information, flow table matching capability information corresponding to the service type, and sending a flow table configuration message to the switch device, where the flow table configuration message carries the flow table matching capability information corresponding to the service type, so that the switch device configures, according to the flow table matching capability information, a flow table required for the service type.

According to the first aspect, in a first possible implementation manner, the flow table matching capability information includes the number of flow table levels corresponding to the service type, the number of entries in each level of flow table, and a flow table match field type of each level of flow table.

According to the first possible implementation manner, in a second possible implementation manner, before the sending a flow table configuration message to the switch device, the method further includes receiving a flow table match field type, currently configured in the switch device and sent by the switch device, of each level of flow table, determining whether the flow table match field type, currently configured in the switch device, of each level of flow table is consistent with a flow table match field type, corresponding to the service type, of each level of flow table, and if the flow table match field type, currently configured in the switch device, of each level of flow table is inconsistent with the flow table match field type, corresponding to the service type, of each level of flow table, performing the step of sending a flow table configuration message to the switch device.

According to the first possible implementation manner, in a third possible implementation manner, before the sending a flow table configuration message to the switch device, the method further includes determining whether a flow table match field type, corresponding to the service type, of each level of flow table is a flow table match field type that can be supported by a corresponding level of flow table in the switch device, and if the flow table match field type, corresponding to the service type, of each level of flow table is the flow table match field type that can be supported by the corresponding level of flow table in the switch device, performing the step of sending a flow table configuration message to the switch device.

According to the first possible implementation manner, in a fourth possible implementation manner, before the sending a flow table configuration message to the switch device, the method further includes receiving a flow table match field type, currently configured in the switch device and sent by the switch device, of each level of flow table, determining whether the flow table match field type, currently configured in the switch device, of each level of flow table is consistent with a flow table match field type, corresponding to the service type, of each level of flow table, if the flow table match field type, currently configured in the switch device, of each level of flow table is inconsistent with the flow table match field type, corresponding to the service type, of each level of flow table, determining whether the flow table match field type, corresponding to the service type, of each level of flow table is a flow table match field type that can be supported by a corresponding level of flow table in the switch device, and if the flow table match field type, corresponding to the service type, of each level of flow table is the flow table match field type that can be supported by the corresponding level of flow table in the switch device, performing the step of sending a flow table configuration message to the switch device.

According to the first possible implementation manner, in a fifth possible implementation manner, before the sending a flow table configuration message to the switch device, the method further includes receiving a flow table match field type, currently configured in the switch device and sent by the switch device, of each level of flow table, determining whether a flow table match field type, corresponding to the service type, of each level of flow table is a flow table match field type that can be supported by a corresponding level of flow table in the switch device, if the flow table match field type, corresponding to the service type, of each level of flow table is the flow table match field type that can be supported by the corresponding level of flow table in the switch device, determining whether the flow table match field type, currently configured in the switch device, of each level of flow table is consistent with the flow table match field type, corresponding to the service type, of each level of flow table, and if the flow table match field type, currently configured in the switch device, of each level of flow table is inconsistent with the flow table match field type, corresponding to the service type, of each level of flow table, performing the step of sending a flow table configuration message to the switch device.

According to the third possible implementation manner or the fourth possible implementation manner or the fifth possible implementation manner, in a sixth possible implementation manner, a flow table match field type that can be supported by each level of flow table in the switch device is prestored in the control device, and the determining whether a flow table match field type, corresponding to the service type, of each level of flow table is a flow table match field type that can be supported by a corresponding level of flow table in the switch device includes determining, according to the prestored flow table match field type that can be supported by each level of flow table in the switch device, whether the flow table match field type, corresponding to the service type, of each level of flow table is the flow table match field type that can be supported by the corresponding level of flow table in the switch device.

According to the third possible implementation manner or the fourth possible implementation manner or the fifth possible implementation manner, in a seventh possible implementation manner, before the determining whether a flow table match field type, corresponding to the service type, of each level of flow table is a flow table match field type that can be supported by a corresponding level of flow table in the switch device, the method further includes receiving a flow table match field type that can be supported by each level of flow table in the switch device and that is sent by the switch device, and the determining whether a flow table match field type, corresponding to the service type, of each level of flow table is a flow table match field type that can be supported by a corresponding level of flow table in the switch device includes determining, according to the flow table match field type that can be supported by each level of flow table in the switch device and that is sent by the switch device, whether the flow table match field type, corresponding to the service type, of each level of flow table is the flow table match field type that can be supported by the corresponding level of flow table in the switch device.

According to the first possible implementation manner to the seventh possible implementation manner, in an eighth possible implementation manner, after the sending a flow table configuration message to the switch device, the method further includes sending a first indication message to the switch device, where the first indication message carries a flow rule delivered by the control device and information about a target level of flow table corresponding to the flow rule, the first indication message instructs the switch device to adapt the flow rule, delivered by the control device, to the target level of flow table and save an adaptation result, and the target level of flow table is a level of flow table in which the adaptation result is to be saved.

According to a second aspect, an embodiment of the present disclosure provides a method for configuring a flow table in an OpenFlow network, where the method is based on an OpenFlow protocol switch device, and the method includes receiving a flow table configuration message sent by a control device, where the flow table configuration message carries flow table matching capability information corresponding to a type of a service needing to be forwarded by the switch device, and configuring, in the switch device according to the flow table matching capability information corresponding to the type of the service needing to be forwarded by the switch device, a flow table corresponding to the type of the service needing to be forwarded by the switch device.

According to the second aspect, in a first possible implementation manner, the flow table matching capability information includes the number of flow table levels corresponding to the service type, the number of entries in each level of flow table, and a flow table match field type of each level of flow table.

According to the first possible implementation manner, in a second possible implementation manner, before the receiving a flow table configuration message sent by a control device, the method further includes sending a flow table match field type, currently configured in the switch device, of each level of flow table to the control device, so that the control device determines whether the flow table match field type, currently configured in the switch device, of each level of flow table is consistent with a flow table match field type, corresponding to the type of the service needing to be forwarded by the switch device, of each level of flow table, and the control device sends the flow table configuration message when the flow table match field type, currently configured in the switch device, of each level of flow table is inconsistent with the flow table match field type, corresponding to the type of the service needing to be forwarded by the switch device, of each level of flow table.

According to the first possible implementation manner, in a third possible implementation manner, before the receiving a flow table configuration message sent by a control device, the method further includes sending a flow table match field type that can be supported by each level of flow table in the switch device to the control device, so that the control device determines whether a flow table match field type, corresponding to the type of the service needing to be forwarded by the switch device, of each level of flow table is a flow table match field type that can be supported by a corresponding level of flow table in the switch device, and the control device sends the flow table configuration message when the flow table match field type, corresponding to the type of the service needing to be forwarded by the switch device, of each level of flow table is the flow table match field type that can be supported by the corresponding level of flow table in the switch device.

According to the first possible implementation manner, in a fourth possible implementation manner, before the receiving a flow table configuration message sent by a control device, the method further includes sending a flow table match field type, currently configured in the switch device, of each level of flow table and a flow table match field type that can be supported by each level of flow table in the switch device to the control device, so that the control device determines whether the flow table match field type, currently configured in the switch device, of each level of flow table is consistent with a flow table match field type, corresponding to the type of the service needing to be forwarded by the switch device, of each level of flow table; when the flow table match field type, currently configured in the switch device, of each level of flow table is inconsistent with the flow table match field type, corresponding to the type of the service needing to be forwarded by the switch device, of each level of flow table, the control device determines whether the flow table match field type, corresponding to the type of the service needing to be forwarded by the switch device, of each level of flow table is a flow table match field type that can be supported by a corresponding level of flow table in the switch device; and the control device sends the flow table configuration message when the flow table match field type, corresponding to the type of the service needing to be forwarded by the switch device, of each level of flow table is the flow table match field type that can be supported by the corresponding level of flow table in the switch device, or, sending a flow table match field type, currently configured in the switch device, of each level of flow table and a flow table match field type that can be supported by each level of flow table in the switch device to the control device, so that the control device determines whether a flow table match field type, corresponding to the type of the service needing to be forwarded by the switch device, of each level of flow table is a flow table match field type that can be supported by a corresponding level of flow table in the switch device; when the flow table match field type, corresponding to the type of the service needing to be forwarded by the switch device, of each level of flow table is the flow table match field type that can be supported by the corresponding level of flow table in the switch device, the control device determines whether the flow table match field type, currently configured in the switch device, of each level of flow table is consistent with the flow table match field type, corresponding to the type of the service needing to be forwarded by the switch device, of each level of flow table; and the control device sends the flow table configuration message when the flow table match field type, currently configured in the switch device, of each level of flow table is inconsistent with the flow table match field type, corresponding to the type of the service needing to be forwarded by the switch device, of each level of flow table.

According to the second aspect to the fourth possible implementation manner, in a fifth possible implementation manner, the configuring, in the switch device according to the flow table matching capability information corresponding to the type of the service needing to be forwarded, a flow table corresponding to the type of the service needing to be forwarded by the switch device includes clearing flow table content currently configured in the switch device, and releasing flow table storage resources, and re-allocating and mapping the flow table storage resources according to the flow table matching capability information corresponding to the type of the service needing to be forwarded.

According to the second aspect to the fifth possible implementation manner, in a sixth possible implementation manner, after the receiving a flow table configuration message sent by a control device, and before the configuring, in the switch device according to the flow table matching capability information of the flow table corresponding to the type of the service needing to be forwarded, the flow table corresponding to the type of the service needing to be forwarded by the switch device, the method further includes disabling a forwarding service port, where the forwarding service port is used for forwarding a service data packet corresponding to the type of the service needing to be forwarded by the switch device, and after the configuring, in the switch device according to the flow table matching capability information corresponding to the type of the service needing to be forwarded, a flow table corresponding to the type of the service needing to be forwarded by the switch device, the method further includes enabling the forwarding service port.

According to the second aspect to the sixth possible implementation manner, in a seventh possible implementation manner, after the configuring, in the switch device according to the flow table matching capability information corresponding to the type of the service needing to be forwarded, a flow table corresponding to the type of the service needing to be forwarded by the switch device, the method further includes receiving a first indication message sent by the control device, where the first indication message carries a flow rule delivered by the control device and information about a target level of flow table corresponding to the flow rule, the first indication message instructs the switch device to adapt the flow rule, delivered by the control device, to the target level of flow table and save an adaptation result, and the target level of flow table is a level of flow table in which the adaptation result is to be saved, and adapting the flow rule, which is carried in the first indication message sent by the control device, to the target level of flow table, and saving the adaptation result.

According to the seventh possible implementation manner, in an eighth possible implementation manner, the first indication message further carries a type of the flow rule, where the type of the flow rule includes a precise flow rule or a wildcard flow rule, and the adapting the flow rule, which is carried in the first indication message sent by the control device, to the target level of flow table, and saving the adaptation result includes determining, according to the type of the flow rule carried in the first indication message, whether the flow rule is a precise flow rule or a wildcard flow rule, if the flow rule is a precise flow rule, extracting a flow table match field matching the target level of flow table from the flow rule according to a currently configured flow table match field type of the target level of flow table, re-arranging, according to a storage structure of the target level of flow table, the flow table match field matching the target level of flow table, and correspondingly storing, in a memory corresponding to the target level of flow table, the arranged flow table match field matching the target level of flow table and other information of the flow rule.

According to the seventh possible implementation manner, in a ninth possible implementation manner, the first indication message further carries a type of the flow rule, where the type of the flow rule includes a precise flow rule or a wildcard flow rule, and the adapting the flow rule, which is carried in the first indication message sent by the control device, to the target level of flow table, and saving the adaptation result includes determining, according to the type of the flow rule carried in the first indication message, whether the flow rule is a precise flow rule or a wildcard flow rule, if the flow rule is a wildcard flow rule, extracting a flow table match field matching the target level of flow table from the flow rule according to a currently configured flow table match field type of the target level of flow table, setting a mask for a flow table match field, which does not match the target level of flow table, in the flow rule, and storing, in a memory corresponding to the target level of flow table, a flow rule that is obtained after the mask is set for the flow table match field, which does not match the target level of flow table, in the flow rule.

According to a third aspect, an embodiment of the present disclosure provides an OpenFlow control device, where the control device includes a service type determining unit, a flow table matching capability information determining unit, and a sending unit, where the service type determining unit is configured to determine a type of a service needing to be forwarded by a switch device, the flow table matching capability information determining unit is configured to determine, according to the type of the service needing to be forwarded by the switch device and a prestored correspondence between a service type and flow table matching capability information, flow table matching capability information corresponding to the service type, and the sending unit is configured to send a flow table configuration message to the switch device, where the flow table configuration message carries the flow table matching capability information corresponding to the service type, so that the switch device configures, according to the flow table matching capability information, a flow table required for the service type.

According to the third aspect, in a first possible implementation manner, the flow table matching capability information includes the number of flow table levels corresponding to the service type, the number of entries in each level of flow table, and a flow table match field type of each level of flow table.

According to the first possible implementation manner, in a second possible implementation manner, the control device further includes a receiving unit, a judgment performing unit, and a performing unit, where the receiving unit is further configured to, before the sending unit sends the flow table configuration message to the switch device, receive a flow table match field type, currently configured in the switch device and sent by the switch device, of each level of flow table, the judgment performing unit is configured to determine whether the flow table match field type, currently configured in the switch device, of each level of flow table is consistent with a flow table match field type, corresponding to the service type, of each level of flow table, and the performing unit is configured to: if the flow table match field type, currently configured in the switch device, of each level of flow table is inconsistent with the flow table match field type, corresponding to the service type, of each level of flow table, perform the step of sending a flow table configuration message to the switch device.

According to the first possible implementation manner, in a third possible implementation manner, the control device further includes a judgment performing unit and a performing unit, where the judgment performing unit is configured to, before the sending unit sends the flow table configuration message to the switch device, determine whether a flow table match field type, corresponding to the service type, of each level of flow table is a flow table match field type that can be supported by a corresponding level of flow table in the switch device, and the performing unit is configured to, if the flow table match field type, corresponding to the service type, of each level of flow table is the flow table match field type that can be supported by the corresponding level of flow table in the switch device, perform the step of sending a flow table configuration message to the switch device.

According to the first possible implementation manner, in a fourth possible implementation manner, the control device further includes a receiving unit, a judgment performing unit, and a performing unit, where the receiving unit is further configured to, before the sending unit sends the flow table configuration message to the switch device, receive a flow table match field type, currently configured in the switch device and sent by the switch device, of each level of flow table, the judgment performing unit is configured to determine whether the flow table match field type, currently configured in the switch device, of each level of flow table is consistent with a flow table match field type, corresponding to the service type, of each level of flow table, and if the flow table match field type, currently configured in the switch device, of each level of flow table is inconsistent with the flow table match field type, corresponding to the service type, of each level of flow table, determine whether the flow table match field type, corresponding to the service type, of each level of flow table is a flow table match field type that can be supported by a corresponding level of flow table in the switch device, and the performing unit is configured to, if the flow table match field type, corresponding to the service type, of each level of flow table is the flow table match field type that can be supported by the corresponding level of flow table in the switch device, perform the step of sending a flow table configuration message to the switch device.

According to the first possible implementation manner, in a fifth possible implementation manner, the control device further includes a receiving unit, a judgment performing unit, and a performing unit, where the receiving unit is further configured to, before the sending unit sends the flow table configuration message to the switch device, receive a flow table match field type, currently configured in the switch device and sent by the switch device, of each level of flow table, the judgment performing unit is configured to determine whether a flow table match field type, corresponding to the service type, of each level of flow table is a flow table match field type that can be supported by a corresponding level of flow table in the switch device, and if the flow table match field type, corresponding to the service type, of each level of flow table is the flow table match field type that can be supported by the corresponding level of flow table in the switch device, determine whether the flow table match field type, currently configured in the switch device, of each level of flow table is consistent with the flow table match field type, corresponding to the service type, of each level of flow table, and the performing unit is configured to, if the flow table match field type, currently configured in the switch device, of each level of flow table is inconsistent with the flow table match field type, corresponding to the service type, of each level of flow table, perform the step of sending a flow table configuration message to the switch device.

According to the third possible implementation manner or the fourth possible implementation manner or the fifth possible implementation manner, in a sixth possible implementation manner, a flow table match field type that can be supported by each level of flow table in the switch device is prestored in the control device, and the determining, by the judgment performing unit, whether a flow table match field type, corresponding to the service type, of each level of flow table is a flow table match field type that can be supported by a corresponding level of flow table in the switch device includes determining, according to the prestored flow table match field type that can be supported by each level of flow table in the switch device, whether the flow table match field type, corresponding to the service type, of each level of flow table is the flow table match field type that can be supported by the corresponding level of flow table in the switch device.

According to the third possible implementation manner or the fourth possible implementation manner or the fifth possible implementation manner, in a seventh possible implementation manner, the receiving unit is configured to, before the judgment performing unit determines whether the flow table match field type, corresponding to the service type, of each level of flow table is the flow table match field type that can be supported by the corresponding level of flow table in the switch device, receive a flow table match field type that can be supported by each level of flow table in the switch device, and the determining, by the judgment performing unit, whether a match field type, corresponding to the service type, of each level of flow table is a flow table match field type that can be supported by a corresponding level of flow table in the switch device includes determining, according to the flow table match field type that can be supported by each level of flow table in the switch device and that is sent by the switch device, whether the flow table match field type, corresponding to the service type, of each level of flow table is the flow table match field type that can be supported by the corresponding level of flow table in the switch device.

According to the third aspect to the seventh possible implementation manner, in an eighth possible implementation manner, the sending unit is further configured to, after sending the flow table configuration message to the switch device, send a first indication message to the switch device, where the first indication message carries a flow rule delivered by the control device and information about a target level of flow table corresponding to the flow rule, the first indication message instructs the switch device to adapt the flow rule, delivered by the control device, to the target level of flow table and save an adaptation result, and the target level of flow table is a level of flow table in which the adaptation result is to be saved.

According to a fourth aspect, an embodiment of the present disclosure provides an OpenFlow switch device, where the switch device includes a receiving unit and a configuration unit, where the receiving unit is configured to receive a flow table configuration message sent by a control device, where the flow table configuration message carries flow table matching capability information corresponding to a type of a service needing to be forwarded by the switch device, and the configuration unit is configured to configure, in the switch device according to the flow table matching capability information corresponding to the type of the service needing to be forwarded, a flow table corresponding to the type of the service needing to be forwarded by the switch device.

According to the fourth aspect, in a first possible implementation manner, the flow table matching capability information includes the number of flow table levels corresponding to the service type, the number of entries in each level of flow table, and a flow table match field type of each level of flow table.

According to the first possible implementation manner, in a second possible implementation manner, the switch device further includes a sending unit, where the sending unit is configured to, before the receiving unit receives the flow table configuration message sent by the control device, send a flow table match field type, currently configured in the switch device, of each level of flow table to the control device, so that the control device determines whether the flow table match field type, currently configured in the switch device, of each level of flow table is consistent with a flow table match field type, corresponding to the type of the service needing to be forwarded by the switch device, of each level of flow table, and the control device sends the flow table configuration message when the flow table match field type, currently configured in the switch device, of each level of flow table is inconsistent with the flow table match field type, corresponding to the type of the service needing to be forwarded by the switch device, of each level of flow table.

According to the first possible implementation manner, in a third possible implementation manner, the switch device further includes a sending unit, where the sending unit is configured to, before the receiving unit receives the flow table configuration message sent by the control device, send a flow table match field type that can be supported by each level of flow table in the switch device to the control device, so that the control device determines whether a flow table match field type, corresponding to the type of the service needing to be forwarded by the switch device, of each level of flow table is a flow table match field type that can be supported by a corresponding level of flow table in the switch device, and the control device sends the flow table configuration message when the flow table match field type, corresponding to the type of the service needing to be forwarded by the switch device, of each level of flow table is the flow table match field type that can be supported by the corresponding level of flow table in the switch device.

According to the first possible implementation manner, in a fourth possible implementation manner, the switch device further includes a sending unit, where the sending unit is configured to send a flow table match field type, currently configured in the switch device, of each level of flow table and a flow table match field type that can be supported by each level of flow table in the switch device to the control device, so that the control device determines whether the flow table match field type, currently configured in the switch device, of each level of flow table is consistent with a match field type, corresponding to the type of the service needing to be forwarded by the switch device, of each level of flow table; when the flow table match field type, currently configured in the switch device, of each level of flow table is inconsistent with the flow table match field type, corresponding to the type of the service needing to be forwarded by the switch device, of each level of flow table, the control device determines whether the flow table match field type, corresponding to the type of the service needing to be forwarded by the switch device, of each level of flow table is a flow table match field type that can be supported by a corresponding level of flow table in the switch device; and the control device sends the flow table configuration message when the flow table match field type, corresponding to the type of the service needing to be forwarded by the switch device, of each level of flow table is the flow table match field type that can be supported by the corresponding level of flow table in the switch device, or, the sending unit is configured to send a flow table match field type, currently configured in the switch device, of each level of flow table and a flow table match field type that can be supported by each level of flow table in the switch device to the control device, so that the control device determines whether a flow table match field type, corresponding to the type of the service needing to be forwarded by the switch device, of each level of flow table is a flow table match field type that can be supported by a corresponding level of flow table in the switch device; when the flow table match field type, corresponding to the type of the service needing to be forwarded by the switch device, of each level of flow table is the flow table match field type that can be supported by the corresponding level of flow table in the switch device, the control device determines whether the flow table match field type, currently configured in the switch device, of each level of flow table is consistent with the flow table match field type, corresponding to the type of the service needing to be forwarded by the switch device, of each level of flow table; and the control device sends the flow table configuration message when the flow table match field type, currently configured in the switch device, of each level of flow table is inconsistent with the flow table match field type, corresponding to the type of the service needing to be forwarded by the switch device, of each level of flow table.

According to the fourth aspect to the fourth possible implementation manner, in a fifth possible implementation manner, the configuring, by the configuration unit in the switch device according to the flow table matching capability information corresponding to the type of the service needing to be forwarded, a flow table corresponding to the type of the service needing to be forwarded by the switch device includes clearing flow table content currently configured in the switch device, and releasing flow table storage resources, and re-allocating and mapping the flow table storage resources according to the flow table matching capability information corresponding to the type of the service needing to be forwarded.

According to the fourth aspect to the fifth possible implementation manner, in a sixth possible implementation manner, the switch device further includes a disabling unit and an enabling unit, where the disabling unit is configured to, after the receiving unit receives the flow table configuration message sent by the control device, and before the configuration unit configures, in the switch device according to the flow table matching capability information corresponding to the type of the service needing to be forwarded, the flow table corresponding to the type of the service needing to be forwarded by the switch device, disable a forwarding service port, where the forwarding service port is used for forwarding a service data packet corresponding to the type of the service needing to be forwarded by the switch device, and the enabling unit is configured to, after the configuration unit configures, in the switch device according to the flow table matching capability information corresponding to the type of the service needing to be forwarded, the flow table corresponding to the type of the service needing to be forwarded by the switch device, enable the forwarding service port.

According to the fourth aspect to the sixth possible implementation manner, in a seventh possible implementation manner, the switch device further includes an adaptation unit and a storage unit, where the receiving unit is further configured to, after the configuration unit configures, in the switch device according to the flow table matching capability information corresponding to the type of the service needing to be forwarded, the flow table corresponding to the type of the service needing to be forwarded by the switch device, receive a first indication message sent by the control device, where the first indication message carries a flow rule delivered by the control device and information about a target level of flow table corresponding to the flow rule, the first indication message instructs the switch device to adapt the flow rule, delivered by the control device, to the target level of flow table and save an adaptation result, and the target level of flow table is a level of flow table in which the adaptation result is to be saved, the adaptation unit is configured to adapt the flow rule, which is carried in the first indication message sent by the control device, to the target level of flow table, and the storage unit is configured to store the adaptation result.

According to the seventh possible implementation manner, in an eighth possible implementation manner, the first indication message further carries a type of the flow rule, where the type of the flow rule includes a precise flow rule or a wildcard flow rule, and the adapting, by the adaptation unit to the target level of flow table, the flow rule carried in the first indication message sent by the control device includes determining, according to the type of the flow rule carried in the first indication message, whether the flow rule is a precise flow rule or a wildcard flow rule, if the flow rule is a precise flow rule, extracting a flow table match field matching the target level of flow table from the flow rule according to a currently configured flow table match field type of the target level of flow table, and re-arranging, according to a storage structure of the target level of flow table, the flow table match field matching the target level of flow table, and the storing, by the storage unit, the adaptation result includes correspondingly storing, in a memory corresponding to the target level of flow table, the arranged flow table match field matching the target level of flow table and other information of the flow rule.

According to the seventh possible implementation manner, in a ninth possible implementation manner, the first indication message further carries a type of the flow rule, where the type of the flow rule includes a precise flow rule or a wildcard flow rule, and the adapting, by the adaptation unit to the target level of flow table, the flow rule carried in the first indication message sent by the control device includes determining, according to the type of the flow rule carried in the first indication message, whether the flow rule is a precise flow rule or a wildcard flow rule, if the flow rule is a wildcard flow rule, extracting a flow table match field matching the target level of flow table from the flow rule according to a currently configured flow table match field type of the target level of flow table, and setting a mask for a flow table match field, which does not match the target level of flow table, in the flow rule, and the storing, by the storage unit, the adaptation result includes storing, in a memory corresponding to the target level of flow table, a flow rule that is obtained after the mask is set for the flow table match field, which does not match the target level of flow table, in the flow rule.

According to a fifth aspect, an embodiment of the present disclosure provides an OpenFlow network system, where the system includes the OpenFlow control device and the OpenFlow switch device according to the embodiments of the present disclosure.

As can be seen, in the method, apparatus, and system for configuring a flow table in an OpenFlow network provided in the embodiments of the present disclosure, a control device determines a type of a service needing to be forwarded by a switch device, determines, according to the type of the service needing to be forwarded by the switch device and a prestored correspondence between a service type and flow table matching capability information, flow table matching capability information corresponding to the service type, and sends a flow table configuration message to the switch device; and the switch device receives the flow table configuration message sent by the control device, and configures, in the switch device according to the flow table matching capability information that corresponds to the type of the service needing to be forwarded by the switch device and is carried in the flow table configuration message, a flow table corresponding to the type of the service needing to be forwarded by the switch device. Based on the descriptions of the foregoing embodiments, when an application scenario of the switch device changes, and consequently a type of a service needing to be forwarded by the switch device changes and therefore a flow table match field currently configured in the switch device cannot satisfy the changed service type, a flow table is dynamically configured, so that a flow table match field configured in the switch device satisfies the service type that is obtained after the application scenario changes, thereby enhancing a service switchover adaptation capability of an entire network system, and improving the working efficiency of the system.

DESCRIPTION OF EMBODIMENTS

Figure 1:
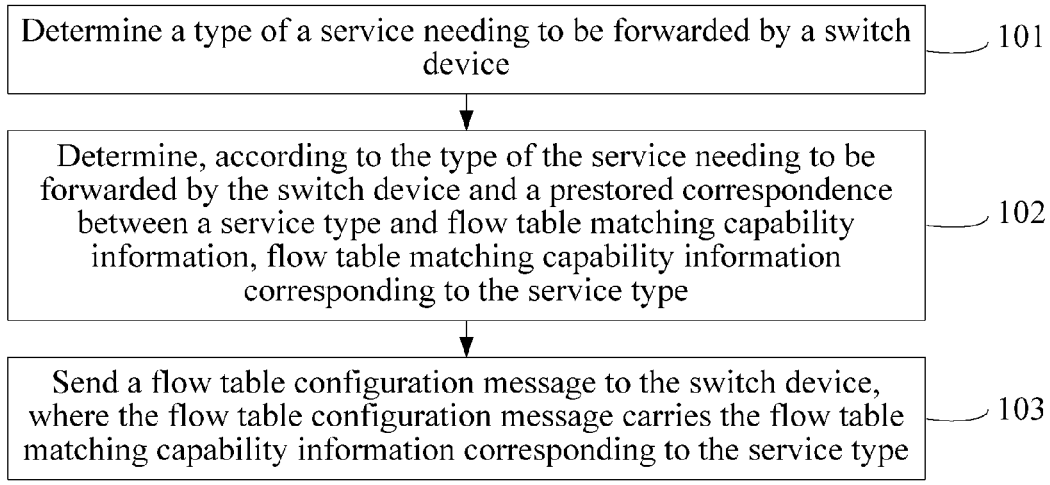
FIG. 1 shows a method for configuring a flow table in an OpenFlow network according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The OpenFlow protocol modifies a network formed by conventional fixed physical hardware to a dynamically variable software defined network (SDN), and is a protocol having an open interface, which can implement separation of a control plane from a forwarding plane.

A network system formed based on the OpenFlow protocol includes an OpenFlow controller and an OpenFlow switch device. The controller manages the switch device connected to the controller, for example, manages the switch device in establishing a new flow table, updating, deleting, and searching a flow table. The switch device executes, in the OpenFlow network, a command from the controller, and forwards a received data packet according to a flow rule delivered by the controller. When the switch device cannot find a corresponding flow rule for a received data packet, the switch device sends the data packet to the controller, and the controller decides a forwarding action of the packet and delivers a new flow rule to the switch device.

The OpenFlow switch device includes three parts, namely, a flow table, a secure channel, and the OpenFlow protocol. The switch device is connected to the OpenFlow controller through the secure channel. The OpenFlow protocol is used for describing a standard used in information exchange between the controller and the switch device; the flow table is a core data structure for performing forwarding policy control by the switch device; and the switch device decides, by searching the flow table, an action taken for network traffic entering the switch.

The OpenFlow switch device receives a flow rule delivered by the OpenFlow controller, and stores the flow rule in an apparatus which is called a flow table. Each entry in the flow table is one flow rule, and the flow rule includes a Match Field, counters, and actions, where the match field is used for performing matching on a received data packet, the counters are used for recording statistical information about matching between the entry and the data packet, and the actions decide how the packet is forwarded.

The match field is classified into two categories: one is a precise match item, that is, matching succeeds only when a data packet is identical to the match field; the other is a wildcard match item, that is, matching succeeds when a part of the data packet is consistent with a corresponding part of the match field, where the other parts can be ignored in a matching process, and an ignoring rule is decided by a mask bit in the match field.

The OpenFlow protocol 1.1 and a later version define a multi-flow table structure of an OpenFlow switch device, that is, multiple levels of flow tables exist in the switch device, and store flow rules of different content separately. For a received data packet, matching starts from Table 0 (a 0-level flow table), and serial searching is performed on subsequent flow tables according to actions in an entry.

Embodiment 1

This embodiment of the present disclosure provides a method for configuring a flow table in an OpenFlow network, where the method is based on an OpenFlow protocol control device, and as shown in FIG. 1, the method includes 101: Determine a type of a service needing to be forwarded by a switch device.

In the OpenFlow network, when the switch device establishes a connection to the control device, the control device first determines the type of the service needing to be forwarded by the switch device.

102: Determine, according to the type of the service needing to be forwarded by the switch device and a prestored correspondence between a service type and flow table matching capability information, flow table matching capability information corresponding to the service type.

In the OpenFlow network, the correspondence between a service type and flow table matching capability information is prestored in the control device, and after the control device determines the type of the service needing to be forwarded by the switch device, the control device determines, according to the type of the service needing to be forwarded by the switch device and the prestored correspondence between a service type and flow table matching capability information, the flow table matching capability information corresponding to the service type.

The flow table matching capability information may include the number of flow table levels corresponding to the service type, the number of entries in each level of flow table, and a flow table match field type of each level of flow table, which is not limited in this embodiment of the present disclosure.

It should be noted that the switch device provides a different flow table match field type in each level of flow table, so as to adapt to a specific application scenario, and support a service needing to be forwarded, as shown in Table 1.

TABLE 1

| Flow table level | Match field | Match type | Service type |
| --- | --- | --- | --- |
| 0-level flow table | Source MAC + destination MAC | Precise matching | L2 |
| 1-level flow table | Input port + VLAN ID | Precise matching | |
| 2-level flow table | Source IP + destination IP + Ethernet type | Wildcard matching | L3 |
| 3-level flow table | Destination MAC + destination IP + destination port | Wildcard matching | Firewall |

103: Send a flow table configuration message to the switch device, where the flow table configuration message carries the flow table matching capability information corresponding to the service type, so that the switch device configures, according to the flow table matching capability information, a flow table required for the service type.

After determining the flow table matching capability information corresponding to the service type, the control device further sends the flow table configuration message to the switch device, so that the switch device can configure, according to the flow table configuration message, the flow table required for the service type.

Certainly, the control device may directly send the flow table configuration message to the switch device after determining the flow table matching capability information corresponding to the service type, or may send the flow table configuration message to the switch device after undergoing other processes, for example, send the flow table configuration message to the switch device after determining that a flow table match field type of each level of flow table in the flow table matching capability information corresponding to the type of the service needing to be forwarded by the switch device is a flow table match field type that can be supported by a corresponding level of flow table in the switch device, and/or after determining that a flow table match field type, currently configured in the switch device, of each level of flow table is inconsistent with a flow table match field type of each level of flow table in the flow table matching capability information corresponding to the type of the service needing to be forwarded by the switch device and that reconfiguration is needed, which is not limited in this embodiment of the present disclosure.

It should be noted that, the control device sending the flow table configuration message is not limited to an OpenFlow controller in an existing OpenFlow network, and may also be a control apparatus integrated with an OpenFlow configuration point, that is, the flow table configuration message may be sent by the OpenFlow configuration point, which is not limited in this embodiment of the present disclosure and only indicates that the control device sends the flow table configuration message to the switch device, to implement configuration of a flow table in the OpenFlow network.

Figure 2:
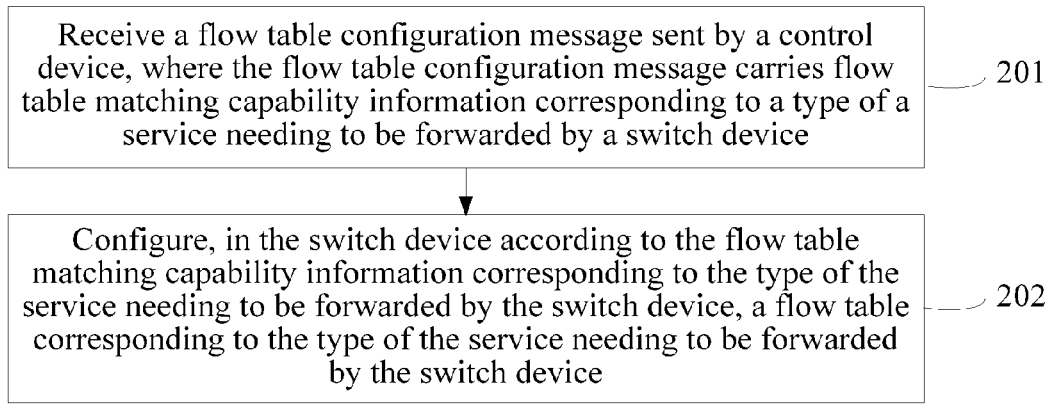
FIG. 2 shows another method for configuring a flow table in an OpenFlow network according to an embodiment of the present disclosure.

This embodiment of the present disclosure further provides a method for configuring a flow table in an OpenFlow network, where the method is based on an OpenFlow protocol switch device, and as shown in FIG. 2, the method includes 201: Receive a flow table configuration message sent by a control device, where the flow table configuration message carries flow table matching capability information corresponding to a type of a service needing to be forwarded by the switch device.

After the control device sends the flow table configuration message to the switch device, the switch device receives the flow table configuration message sent by the control device.

The flow table matching capability information may include the number of flow table levels corresponding to the service type, the number of entries in each level of flow table, and a flow table match field type of each level of flow table, which is not limited in this embodiment of the present disclosure.

202: Configure, in the switch device according to the flow table matching capability information corresponding to the type of the service needing to be forwarded by the switch device, a flow table corresponding to the type of the service needing to be forwarded by the switch device.

After the switch device receives the flow table configuration message, the configuring, in the switch device according to the flow table matching capability information corresponding to the type of the service needing to be forwarded by the switch device, a flow table corresponding to the type of the service needing to be forwarded by the switch device may include clearing flow table content currently configured in the switch device, and releasing flow table storage resources, and re-allocating and mapping the flow table storage resources according to the flow table matching capability information corresponding to the type of the service needing to be forwarded.

This embodiment of the present disclosure provides a method for configuring a flow table in an OpenFlow network. The method includes determining, by a control device, a type of a service needing to be forwarded by a switch device; determining, according to the type of the service needing to be forwarded by the switch device and a prestored correspondence between a service type and flow table matching capability information, flow table matching capability information corresponding to the service type; and sending a flow table configuration message to the switch device; and receiving, by the switch device, the flow table configuration message sent by the control device, and configuring, in the switch device according to the flow table matching capability information that corresponds to the type of the service needing to be forwarded by the switch device and is carried in the flow table configuration message, a flow table corresponding to the type of the service needing to be forwarded by the switch device.

Based on the descriptions of the method for configuring a flow table in an OpenFlow network provided in the foregoing embodiment, in the method, when an application scenario of a switch device changes, and consequently a type of a service needing to be forwarded by the switch device changes and therefore a flow table match field currently configured in the switch device cannot satisfy the changed service type, a flow table is dynamically configured, so that a flow table match field configured in the switch device satisfies the service type that is obtained after the application scenario changes, thereby enhancing a service switchover adaptation capability of an entire network system, and improving the working efficiency of the system.

Embodiment 2

Figure 3:
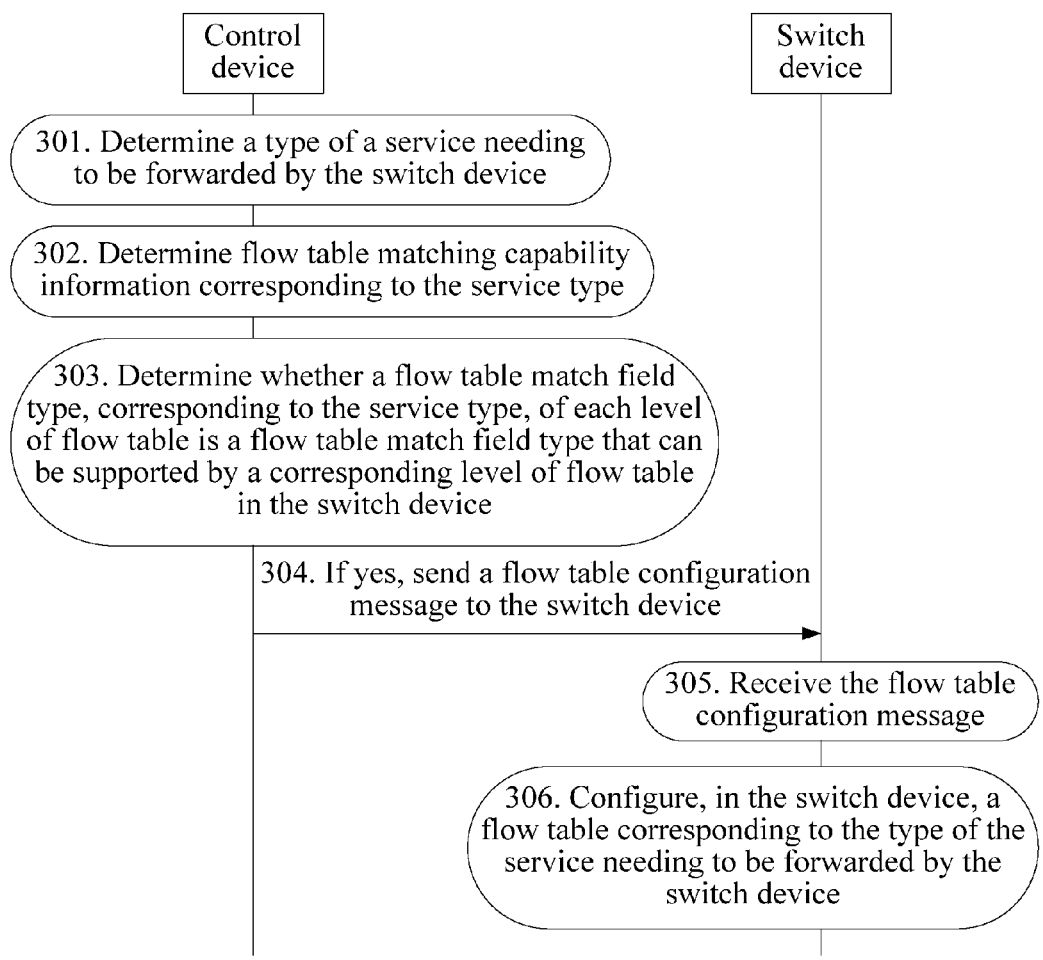
FIG. 3 shows still another method for configuring a flow table in an OpenFlow network according to an embodiment of the present disclosure.

This embodiment of the present disclosure provides a method for configuring a flow table in an OpenFlow network, where the method is based on an OpenFlow protocol control device and a switch device connected to the control device, and as shown in FIG. 3, the method includes 301: The control device determines a type of a service needing to be forwarded by the switch device.

In the OpenFlow network, when the switch device establishes a connection to the control device, the control device first determines the type of the service needing to be forwarded by the switch device.

302: The control device determines, according to the type of the service needing to be forwarded by the switch device and a prestored correspondence between a service type and flow table matching capability information, flow table matching capability information corresponding to the service type.

The flow table matching capability information includes the number of flow table levels corresponding to the service type, the number of entries in each level of flow table, and a flow table match field type of each level of flow table.

In the OpenFlow network, the correspondence between a service type and flow table matching capability information is prestored in the control device, and after the control device determines the type of the service needing to be forwarded by the switch device, the control device determines, according to the type of the service needing to be forwarded by the switch device and the prestored correspondence between a service type and flow table matching capability information, the flow table matching capability information corresponding to the service type.

303: The control device determines whether a flow table match field type, corresponding to the service type, of each level of flow table is a flow table match field type that can be supported by a corresponding level of flow table in the switch device.

A flow table match field type that can be supported by each level of flow table in the switch device may be prestored in the control device, or may be acquired through interaction between the control device and the switch device, which is not limited in this embodiment of the present disclosure and only indicates that the control device determines whether the flow table match field type, corresponding to the service type, of each level of flow table is the flow table match field type that can be supported by the corresponding level of flow table in the switch device.

304: If the flow table match field type, corresponding to the service type, of each level of flow table is the flow table match field type that can be supported by the corresponding level of flow table in the switch device, the control device sends a flow table configuration message to the switch device, where the flow table configuration message carries the flow table matching capability information corresponding to the service type.

If the flow table match field type, corresponding to the service type, of each level of flow table is the flow table match field type that can be supported by the corresponding level of flow table in the switch device, it indicates that the switch device supports configuration of a flow table corresponding to the service type, and in this case, the flow table configuration message is sent to the switch device.

Certainly, if the flow table match field type, corresponding to the service type, of each level of flow table is not the flow table match field type that can be supported by the corresponding level of flow table in the switch device, the flow table cannot be configured, and in this case, the control device may send an error report message. However, a case in which the flow table cannot be configured is beyond the discussion scope of the present disclosure. Therefore this embodiment of the present disclosure imposes no specific limitation thereto.

305: The switch device receives the flow table configuration message sent by the control device.

306: The switch device configures, in the switch device according to the flow table matching capability information corresponding to the service type and carried in the flow table configuration message, a flow table corresponding to the type of the service needing to be forwarded by the switch device.

The configuring, by the switch device in the switch device according to the flow table matching capability information corresponding to the service type and carried in the flow table configuration message, a flow table corresponding to the type of the service needing to be forwarded by the switch device includes clearing flow table content currently configured in the switch device, and releasing flow table storage resources, and re-allocating and mapping the flow table storage resources according to the flow table matching capability information corresponding to the type of the service needing to be forwarded.

In this method, before the flow table configuration message is sent, whether the flow table match field type, corresponding to the service type, of each level of flow table is the flow table match field type that can be supported by the corresponding level of flow table in the switch device is determined, and the flow table configuration message is sent only when the flow table match field type, corresponding to the service type, of each level of flow table is the flow table match field type that can be supported by the corresponding level of flow table in the switch device, thereby enhancing transparency of configuration of the flow table.

Further, if the flow table match field type that can be supported by each level of flow table in the switch device is acquired through interaction between the control device and the switch device, before the determining, by the control device, whether a flow table match field type, corresponding to the service type, of each level of flow table is a flow table match field type that can be supported by a corresponding level of flow table in the switch device, the method further includes sending, by the switch device, the flow table match field type that can be supported by each level of flow table in the switch device to the control device, and receiving, by the control device, the flow table match field type that can be supported by each level of flow table in the switch device and that is sent by the switch device.

Figure 4:
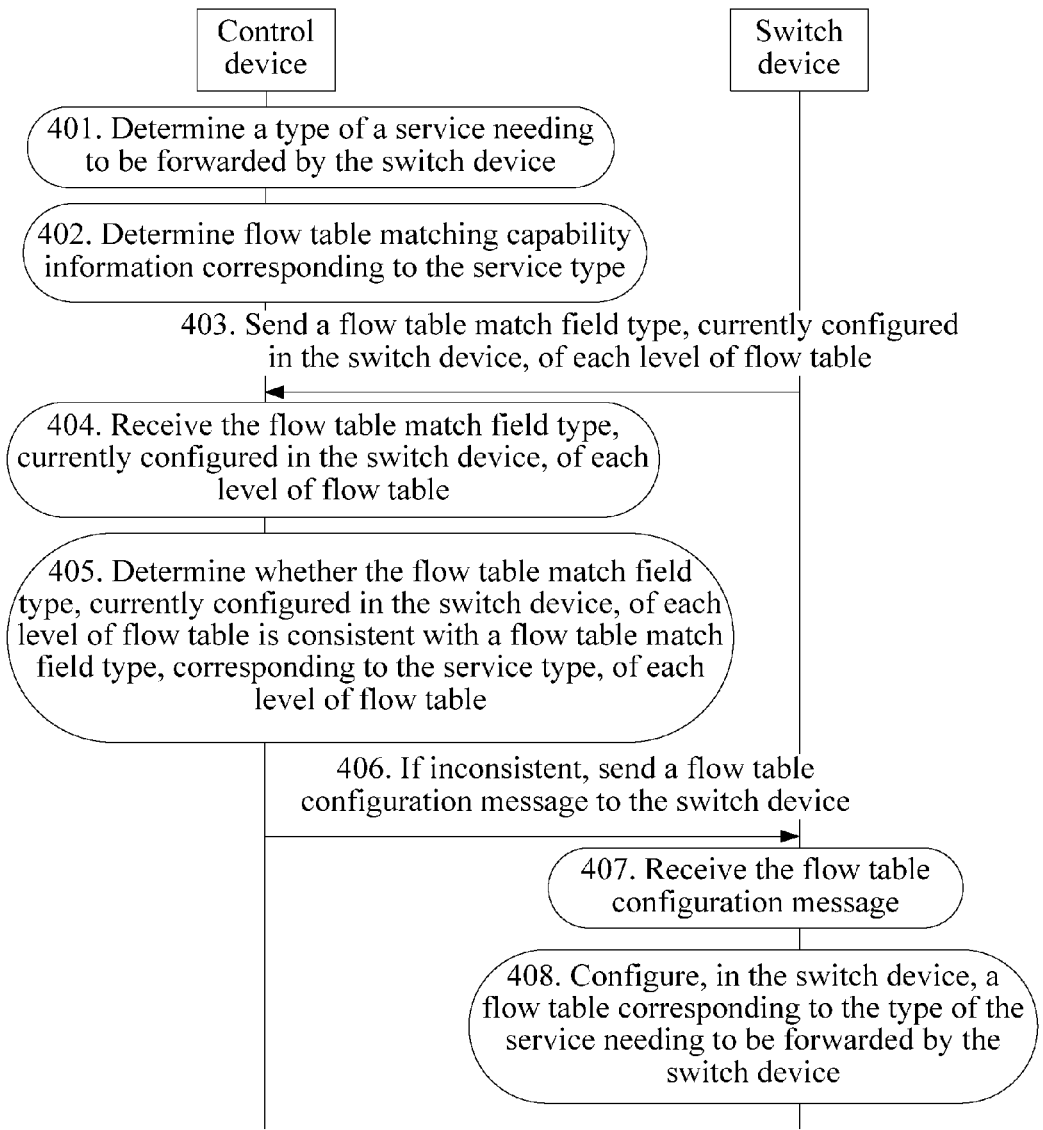
FIG. 4 shows yet another method for configuring a flow table in an OpenFlow network according to an embodiment of the present disclosure.

This embodiment of the present disclosure further provides a method for configuring a flow table in an OpenFlow network, where the method is described by using an example in which the control device sends a flow table configuration message to the switch device after determining that a flow table of the switch device needs to be reconfigured, and as shown in FIG. 4, the method includes 401: The control device determines a type of a service needing to be forwarded by the switch device.

In the OpenFlow network, when the switch device establishes a connection to the control device, the control device first determines the type of the service needing to be forwarded by the switch device.

402: Determine, according to the type of the service needing to be forwarded by the switch device and a prestored correspondence between a service type and flow table matching capability information, flow table matching capability information corresponding to the service type.

The flow table matching capability information includes the number of flow table levels corresponding to the service type, the number of entries in each level of flow table, and a flow table match field type of each level of flow table.

In the OpenFlow network, the correspondence between a service type and flow table matching capability information is prestored in the control device, and after the control device determines the type of the service needing to be forwarded by the switch device, the control device determines, according to the type of the service needing to be forwarded by the switch device and the prestored correspondence between a service type and flow table matching capability information, the flow table matching capability information corresponding to the service type.

403: The switch device sends a flow table match field type, currently configured in the switch device, of each level of flow table to the control device.

404: The control device receives the flow table match field type, currently configured in the switch device and sent by the switch device, of each level of flow table.

405: The control device determines whether the flow table match field type, currently configured in the switch device, of each level of flow table is consistent with a flow table match field type, corresponding to the service type, of each level of flow table.

If the flow table match field type, currently configured in the switch device, of each level of flow table is consistent with the flow table match field type, corresponding to the service type, of each level of flow table, it may be determined that the flow table of the switch device does not need to be reconfigured, and if the flow table match field type, currently configured in the switch device, of each level of flow table is inconsistent with the flow table match field type, corresponding to the service type, of each level of flow table, it may be determined that the flow table of the switch device needs to be reconfigured, and step 406 is performed.

406: If the flow table match field type, currently configured by the switch device, of each level of flow table is inconsistent with the flow table match field type, corresponding to the service type, of each level of flow table, send a flow table configuration message to the switch device, where the flow table configuration message carries the flow table matching capability information corresponding to the type of the service needing to be forwarded by the switch device.

407: The switch device receives the flow table configuration message sent by the control device.

408: The switch device configures, in the switch device according to the flow table matching capability information that corresponds to the type of the service needing to be forwarded by the switch device and is carried in the flow table configuration message, a flow table corresponding to the type of the service needing to be forwarded by the switch device.

The configuring, by the switch device in the switch device according to the flow table matching capability information corresponding to the service type and carried in the flow table configuration message, a flow table corresponding to the type of the service needing to be forwarded by the switch device includes clearing flow table content currently configured in the switch device, and releasing flow table storage resources, and re-allocating and mapping the flow table storage resources according to the flow table matching capability information corresponding to the type of the service needing to be forwarded.

In this method, the control device sends the flow table configuration message after determining that the flow table needs to be reconfigured, so that the switch device configures the flow table, thereby avoiding an operation of flow table configuration when the flow table does not need to be reconfigured, and saving system resources.

Figure 5:
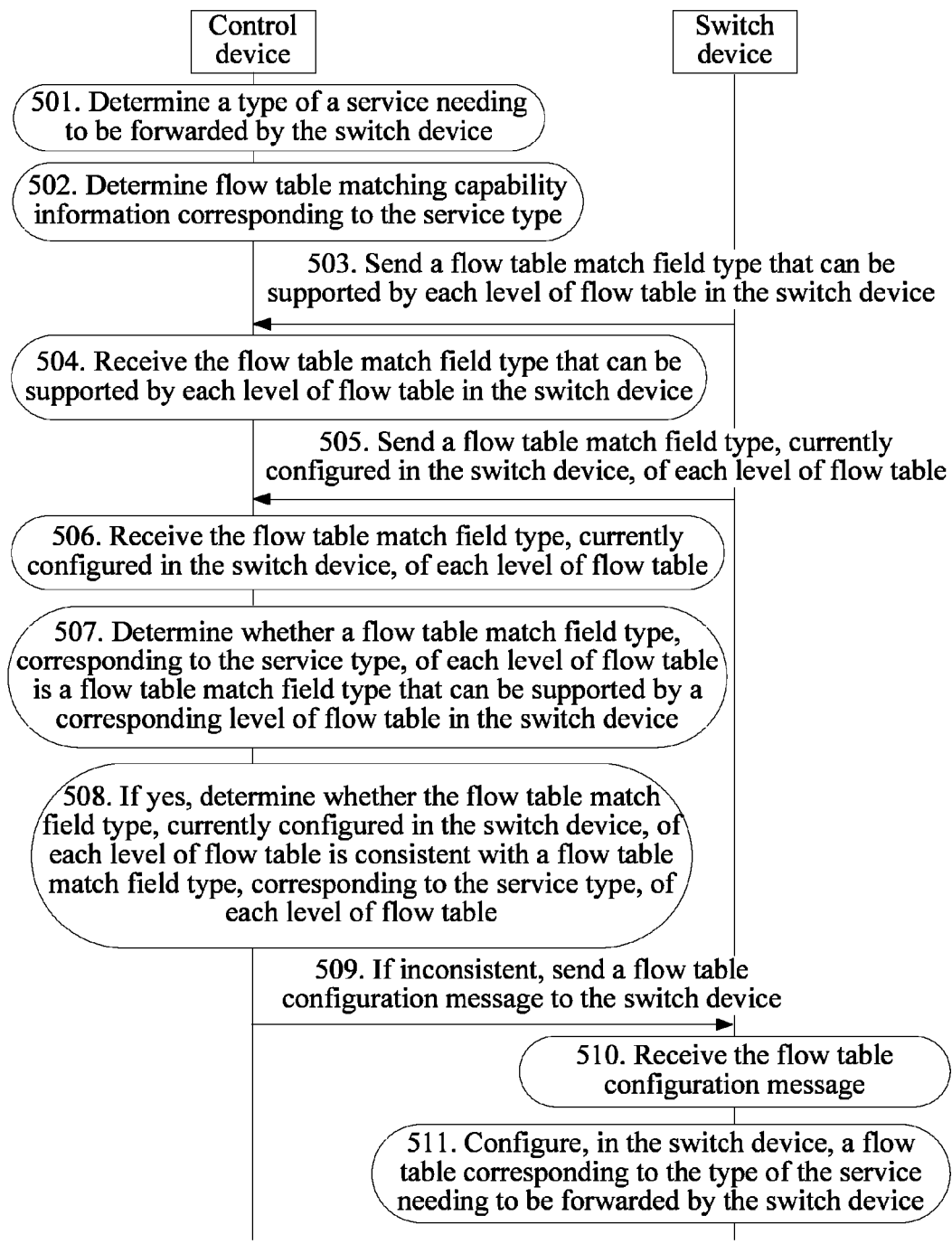
FIG. 5 shows still yet another method for configuring a flow table in an OpenFlow network according to an embodiment of the present disclosure.

Optionally, this embodiment of the present disclosure further provides a method for configuring a flow table in an OpenFlow network. As shown in FIG. 5, the method includes 501: A control device determines a type of a service needing to be forwarded by a switch device.

502: The control device determines, according to the type of the service needing to be forwarded by the switch device and a prestored correspondence between a service type and flow table matching capability information, flow table matching capability information corresponding to the service type.

The flow table matching capability information includes the number of flow table levels corresponding to the service type, the number of entries in each level of flow table, and a flow table match field type of each level of flow table.

503: The switch device sends a flow table match field type that can be supported by each level of flow table in the switch device to the control device.

It should be noted that step 501, step 502, and step 503 are not in an absolute sequence. The determining, by a control device, a type of a service needing to be forwarded by a switch device and the sending, by the switch device, a flow table match field type that can be supported by each level of flow table in the switch device to the control device are actions executed by the control device and the switch device respectively at the beginning when the switch device and control device establish a connection, and a sequence of the two steps is not limited in this embodiment of the present disclosure.

504: The control device receives the flow table match field type that can be supported by each level of flow table in the switch device and that is sent by the switch device.

505: The switch device sends a flow table match field type, currently configured in the switch device, of each level of flow table to the control device.

It should be noted that step 503 and step 505 are not in an absolute sequence, the flow table match field types in the two steps may be sent by the switch device to the control device at a time or at two times when the control device and the switch device establish a connection, which is not limited in this embodiment of the present disclosure.

506: The control device receives the flow table match field type, currently configured in the switch device and sent by the switch device, of each level of flow table.

507: The control device determines whether a flow table match field type, corresponding to the service type, of each level of flow table is a flow table match field type that can be supported by a corresponding level of flow table in the switch device.

508: If the flow table match field type, corresponding to the service type, of each level of flow table is the flow table match field type that can be supported by the corresponding level of flow table in the switch device, determine whether the flow table match field type, currently configured in the switch device, of each level of flow table is consistent with a flow table match field type, corresponding to the service type, of each level of flow table.

509: If the flow table match field type, currently configured by the switch device, of each level of flow table is inconsistent with the flow table match field type, corresponding to the service type, of each level of flow table, send a flow table configuration message to the switch device, where the flow table configuration message carries the flow table matching capability information corresponding to the type of the service needing to be forwarded by the switch device.

510: The switch device receives the flow table configuration message sent by the control device.

511: The switch device configures, in the switch device according to the flow table matching capability information that corresponds to the type of the service needing to be forwarded by the switch device and is carried in the flow table configuration message, a flow table corresponding to the type of the service needing to be forwarded by the switch device.

For specific descriptions of the method for configuring a flow table in an OpenFlow network, reference may be made to the descriptions of the embodiments shown in FIG. 3 and FIG. 4, and details are not repeatedly described in this embodiment of the present disclosure.

In this method, before the flow table configuration message is sent, not only whether the flow table match field type, corresponding to the service type, of each level of flow table is the flow table match field type that can be supported by the corresponding level of flow table in the switch device is determined, but also whether the flow table of the switch device needs to be reconfigured is determined; and after it is determined that the flow table match field type, corresponding to the service type, of each level of flow table is the flow table match field type that can be supported by the corresponding level of flow table in the switch device, and it is determined that the flow table of the switch device needs to be reconfigured, the flow table configuration message is sent, so that the switch device configures a needed flow table, thereby enhancing transparency of configuration of the flow table, avoiding an operation of flow table configuration when the flow table does not need to be reconfigured, and saving system resources.

Figure 6:
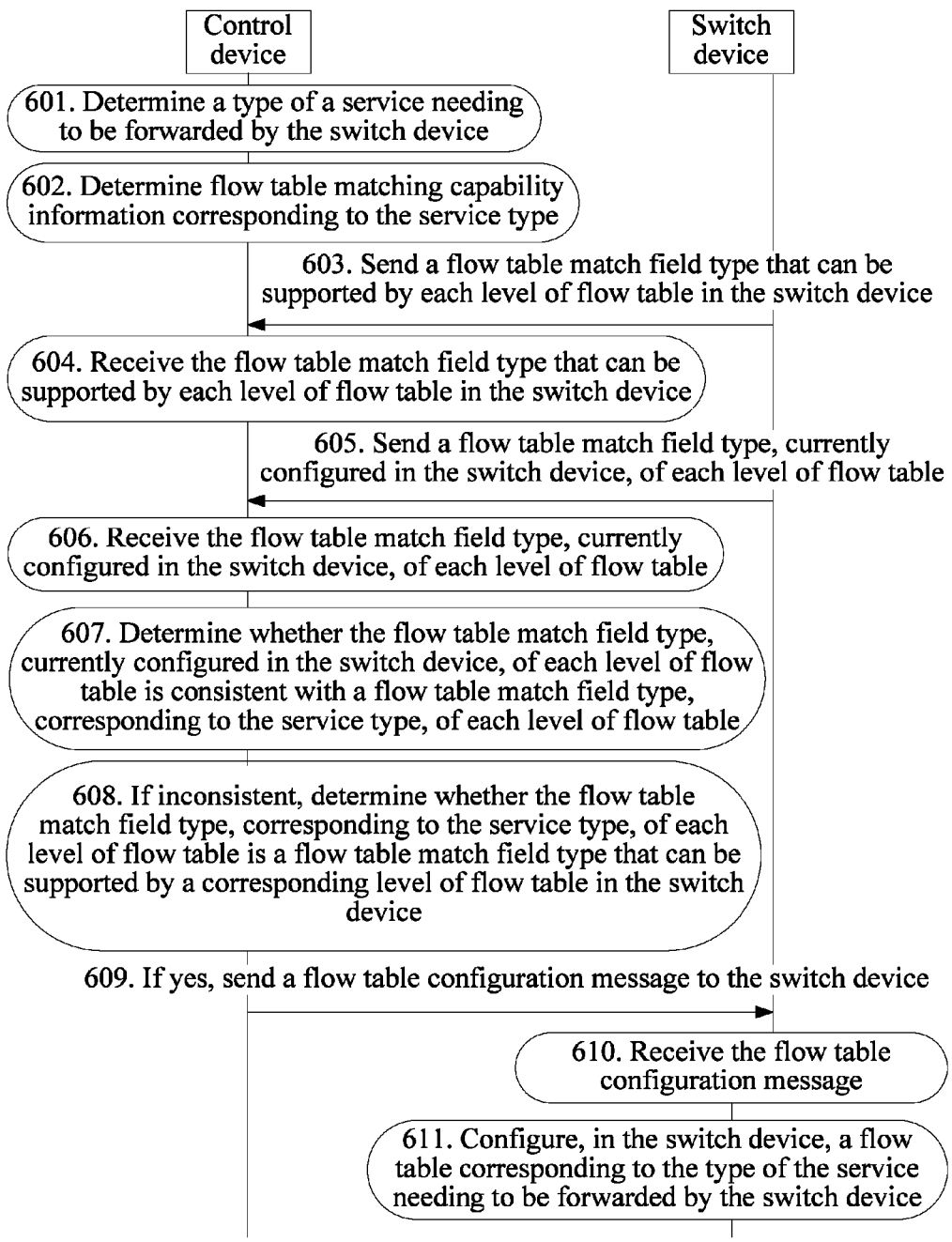
FIG. 6 shows a further method for configuring a flow table in an OpenFlow network according to an embodiment of the present disclosure.

Optionally, this embodiment of the present disclosure further provides a method for configuring a flow table. As shown in FIG. 6, the method includes 601: A control device determines a type of a service needing to be forwarded by a switch device.

602: The control device determines, according to the type of the service needing to be forwarded by the switch device and a prestored correspondence between a service type and flow table matching capability information, flow table matching capability information corresponding to the service type.

The flow table matching capability information includes the number of flow table levels corresponding to the service type, the number of entries in each level of flow table, and a flow table match field type of each level of flow table.

603: The switch device sends a flow table match field type that can be supported by each level of flow table in the switch device to the control device.

It should be noted that step 601, step 602, and step 603 are not in an absolute sequence. The determining, by a control device, a type of a service needing to be forwarded by a switch device and the sending, by the switch device, a flow table match field type that can be supported by each level of flow table in the switch device to the control device are actions executed by the control device and the switch device respectively at the beginning when the switch device and control device establish a connection, and a sequence of the two steps is not limited in this embodiment of the present disclosure.

604: The control device receives the flow table match field type that can be supported by each level of flow table in the switch device and that is sent by the switch device.

605: The switch device sends a flow table match field type, currently configured in the switch device, of each level of flow table to the control device.

It should be noted that step 603 and step 605 are not in an absolute sequence, the flow table match field types in the two steps may be sent by the switch device to the control device at a time or at two times when the control device and the switch device establish a connection, which is not limited in this embodiment of the present disclosure.

606: The control device receives the flow table match field type, currently configured in the switch device and sent by the switch device, of each level of flow table.

607: The control device determines whether the flow table match field type, currently configured in the switch device, of each level of flow table is consistent with a flow table match field type, corresponding to the service type, of each level of flow table.

608: If the flow table match field type, currently configured by the switch device, of each level of flow table is inconsistent with the flow table match field type, corresponding to the service type, of each level of flow table, determine whether the flow table match field type, corresponding to the service type, of each level of flow table is a flow table match field type that can be supported by a corresponding level of flow table in the switch device.

609: If the flow table match field type, corresponding to the service type, of each level of flow table is the flow table match field type that can be supported by the corresponding level of flow table in the switch device, send a flow table configuration message to the switch device, where the flow table configuration message carries the flow table matching capability information corresponding to the type of the service needing to be forwarded by the switch device.

610: The switch device receives the flow table configuration message sent by the control device.

611: The switch device configures, in the switch device according to the flow table matching capability information that corresponds to the type of the service needing to be forwarded by the switch device and is carried in the flow table configuration message, a flow table corresponding to the type of the service needing to be forwarded by the switch device.

For specific descriptions of the method for configuring a flow table in an OpenFlow network, reference may be made to the descriptions of the embodiments shown in FIG. 3 and FIG. 4, and details are not repeatedly described in this embodiment of the present disclosure.

A difference between the embodiment shown in FIG. 6 and the embodiment shown in FIG. 5 only lies in that a sequence of determining whether the flow table match field type, corresponding to the service type, of each level of flow table is the flow table match field type that can be supported by the corresponding level of flow table in the switch device, and determining whether the flow table of the switch device needs to be reconfigured is different. However, in both of the embodiments, the flow table configuration message is sent only after it is determined that the flow table match field type, corresponding to the service type, of each level of flow table is the flow table match field type that can be supported by the corresponding level of flow table in the switch device, and after it is determined that the flow table of the switch device needs to be reconfigured, so that the switch device configures a needed flow table, thereby enhancing transparency of configuration of the flow table, avoiding an operation of flow table configuration when the flow table does not need to be reconfigured, and saving system resources.

Further, to ensure that no erroneous forwarding of a data packet occurs in a process of configuring the flow table, after the receiving the flow table configuration message sent by the control device, and before the configuring, in the switch device according to the flow table matching capability information corresponding to the type of the service needing to be forwarded, a flow table corresponding to the type of the service needing to be forwarded by the switch device, the method further includes disabling a forwarding service port, where the forwarding service port is used for forwarding a service data packet corresponding to the type of the service needing to be forwarded by the switch device, and after the configuring, in the switch device according to the flow table matching capability information corresponding to the type of the service needing to be forwarded, a flow table corresponding to the type of the service needing to be forwarded by the switch device, the method further includes enabling the forwarding service port.

Figure 7:
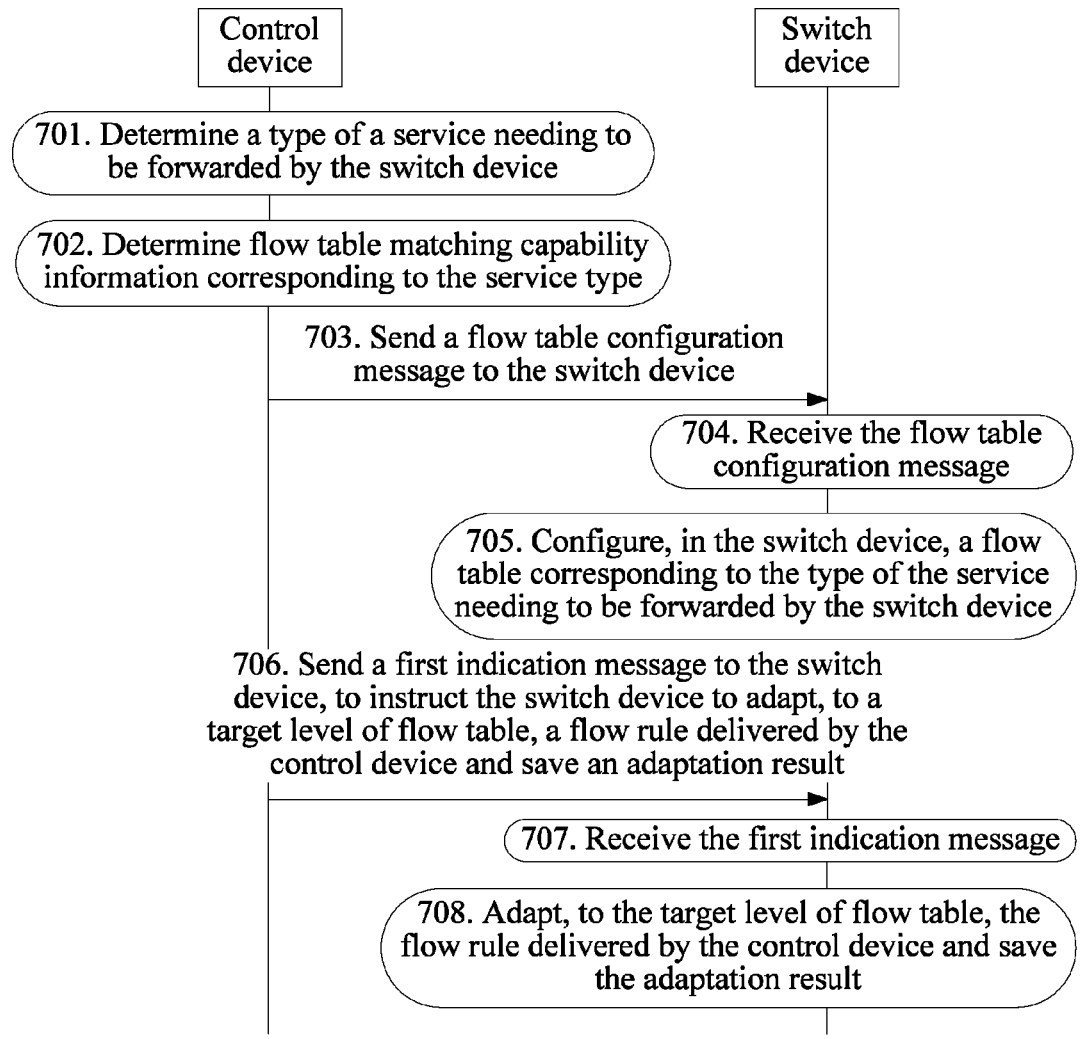
FIG. 7 shows a still further method for configuring a flow table in an OpenFlow network according to an embodiment of the present disclosure.

Further, this embodiment of the present disclosure further provides a method for configuring a flow table in an OpenFlow network. The method is described by using an example in which the control device further delivers a flow rule to the switch device after flow table configuration is completed, and as shown in FIG. 7, the method includes 701: The control device determines a type of a service needing to be forwarded by the switch device.

In the OpenFlow network, when the switch device establishes a connection to the control device, the control device first determines the type of the service needing to be forwarded by the switch device.

702: The control device determines, according to the type of the service needing to be forwarded by the switch device and a prestored correspondence between a service type and flow table matching capability information, flow table matching capability information corresponding to the service type.

In the OpenFlow network, the correspondence between a service type and flow table matching capability information is prestored in the control device, and after the control device determines the type of the service needing to be forwarded by the switch device, the control device determines, according to the type of the service needing to be forwarded by the switch device and the prestored correspondence between a service type and flow table matching capability information, the flow table matching capability information corresponding to the service type.

The flow table matching capability information may include the number of flow table levels corresponding to the service type, the number of entries in each level of flow table, and a flow table match field type of each level of flow table.

703: The control device sends a flow table configuration message to the switch device, where the flow table configuration message carries the flow table matching capability information corresponding to the service type.

704: The switch device receives the flow table configuration message sent by the control device.

705: The switch device configures, in the switch device according to the flow table matching capability information corresponding to the type of the service needing to be forwarded by the switch device, a flow table corresponding to the type of the service needing to be forwarded by the switch device.

The configuring, by the switch device in the switch device according to the flow table matching capability information corresponding to the type of the service needing to be forwarded, a flow table corresponding to the type of the service needing to be forwarded by the switch device may include clearing flow table content currently configured in the switch device, and releasing flow table storage resources, and re-allocating and mapping the flow table storage resources according to the flow table matching capability information corresponding to the type of the service needing to be forwarded.

706: The control device sends a first indication message to the switch device, where the first indication message carries a flow rule delivered by the control device and information about a target level of flow table corresponding to the flow rule, the first indication message instructs the switch device to adapt the flow rule, delivered by the control device, to the target level of flow table and save an adaptation result, and the target level of flow table is a level of flow table in which the adaptation result is to be saved.

After the switch device configures, in the switch device, the flow table corresponding to the type of the service needing to be forwarded, the switch device may send a flow table configuration completion indication message to the control device to ensure that the controller learns a state of the switch device in time, so that the control device sends the first indication message to the switch device, and the control device may also directly perform step 706 in a period of time after step 703 is performed, which is not limited in this embodiment of the present disclosure and only indicates that the control device sends the first indication message to the switch device, where the first indication message carries the flow rule delivered by the control device and the information about the target level of flow table corresponding to the flow rule.

707: The switch device receives the first indication message sent by the control device.

708: The switch device adapts the flow rule, which is carried in the first indication message sent by the control device, to the target level of flow table, and saves an adaptation result.

Figure 8:
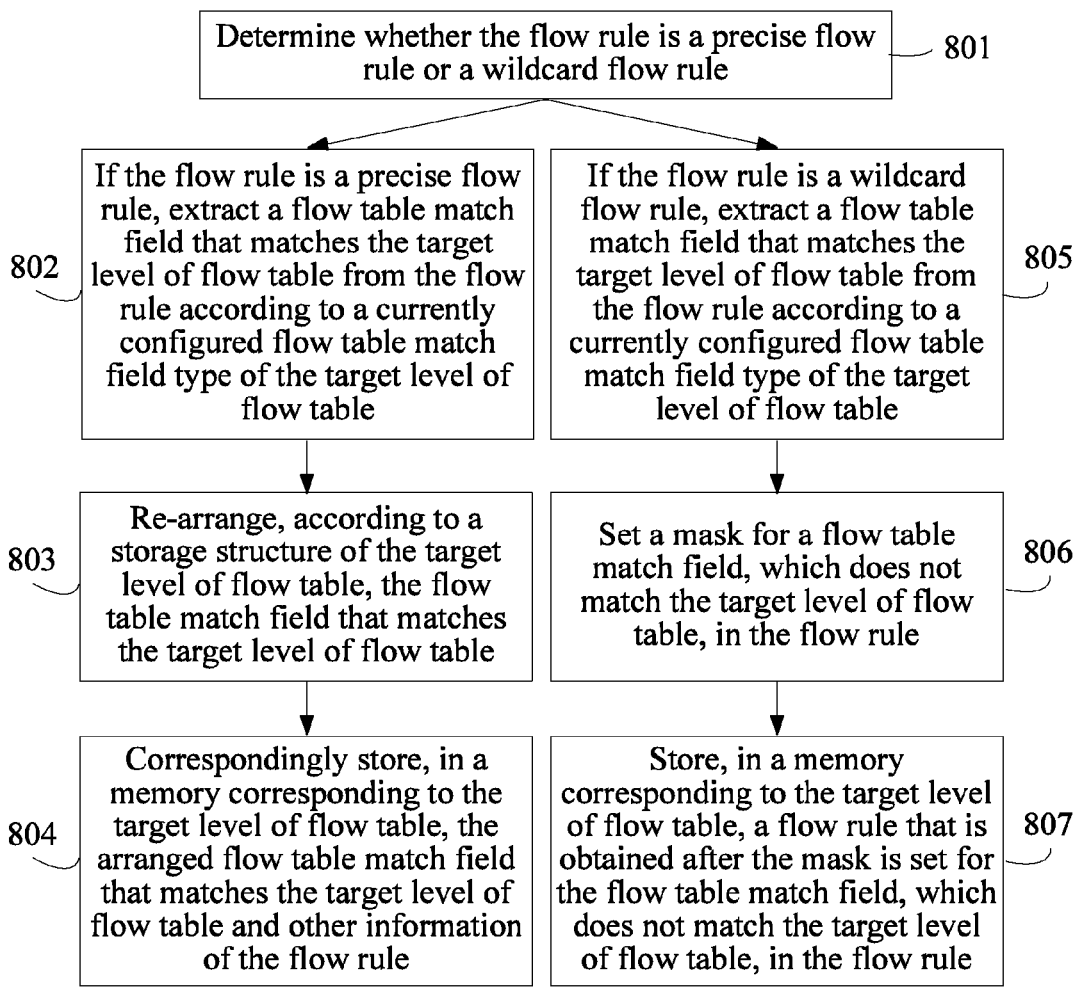
FIG. 8 shows a method of saving an adaptation result by a switch device after adapting, to a target level of flow table, a flow rule delivered by a control device in an OpenFlow network according to an embodiment of the present disclosure.

The first indication message further carries a type of the flow rule, where the type of the flow rule includes a precise flow rule or a wildcard flow rule. As shown in FIG. 8, a method of saving an adaptation result after the switch device adapts the flow rule, which is carried in the first indication message sent by the control device, to the target level of flow table includes 801: Determine, according to the type of the flow rule carried in the first indication message, whether the flow rule is a precise flow rule or a wildcard flow rule.

In the switch device of the OpenFlow network, a match field of a flow table is classified into two categories: one is a precise match item, that is, matching succeeds only when a data packet is identical to the match field; the other is a wildcard match item, that is, matching succeeds when a part of the data packet is consistent with a corresponding part of the match field, where the other parts can be ignored in a matching process, and an ignoring rule is decided by a mask bit in the match field.

Correspondingly, the flow rule delivered by the control device is classified into two categories: one is a precise flow rule, and the other is a wildcard flow rule. Different flow rules have different adaptation and saving manners if the flow rule is a precise flow rule, perform step 802, and if the flow rule is a wildcard flow rule, perform step 805.

802: If the flow rule is a precise flow rule, extract a flow table match field matching the target level of flow table from the flow rule according to a currently configured flow table match field type of the target level of flow table.

Figure 9:
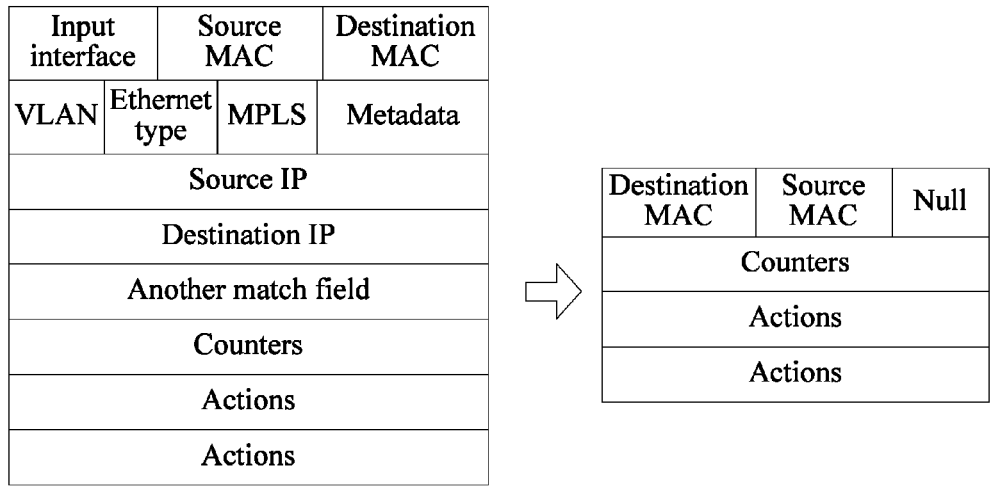
FIG. 9 is a conversion diagram of a precise matching flow rule according to an embodiment of the present disclosure.

For example, if the controller delivers a flow rule shown on the left side of FIG. 9 to the 0-level flow table in Table 1, because a flow table match field type of the 0-level flow table in Table 1 is precise matching, and a match field is source Media Access Control (MAC)+destination MAC, the switch device first extracts the source MAC and the destination MAC from match field of the flow rule on the left side of FIG. 9.

803: Re-arrange, according to a storage structure of the target level of flow table, the flow table match field matching the target level of flow table.

Because the flow table corresponding to the type of the service needing to be forwarded by the switch device is configured in the switch device, according to the foregoing example, the extracted source MAC and destination MAC need to be re-arranged according to the storage structure of the 0-level flow table.

804: Correspondingly store, in a memory corresponding to the target level of flow table, the arranged flow table match field matching the target level of flow table and other information of the flow rule.

After the flow table match field matching the target level of flow table is re-arranged, the arranged flow table match field that matches the target level of flow table and other information of the flow rule are correspondingly stored in the memory corresponding to the target level of flow table. A precise storage format of the flow rule on the left side of FIG. 9 is shown on the right side of FIG. 9.

It should be noted that design of the flow table in the switch device is classified into homogeneous design and heterogenous design. Heterogenous design is commonly used, that is, different flow table levels of a same type need to be stored in separate memories. For example, a level of flow table having a match field being A+B+C needs to be stored in one memory, another level of flow table having a match field being C+D+E needs to be stored in another memory, and so on. Such design is relatively complex, and is not beneficial for a flow table management module to implement dynamic adjustment of a flow table type. Therefore, homogeneous design may be considered in the design of the flow table, that is, a flow table management module in the switch device and a data structure for storing the flow table do not need to be separately designed according to the type of the flow table, and instead, one flow table management module manages flow tables of all types, one storage entity may store precise flow tables of all types and another storage entity may store wildcard flow tables of all types, thereby facilitating dynamic configuration of flow tables of different types.

The internal design of the switch device is not limited in this embodiment of the present disclosure and only indicates that the flow table match field that matches the target flow table and other information corresponding to the flow rule are stored in the memory corresponding to the target level of flow table. The other information herein refers to information of the flow rule except the match field information, for example, actions and counters in the flow rule shown in FIG. 9.

805: If the flow rule is a wildcard flow rule, extract a flow table match field that matches the target flow table from the flow rule according to a currently configured flow table match field type of the target level of flow table.

Figure 10:
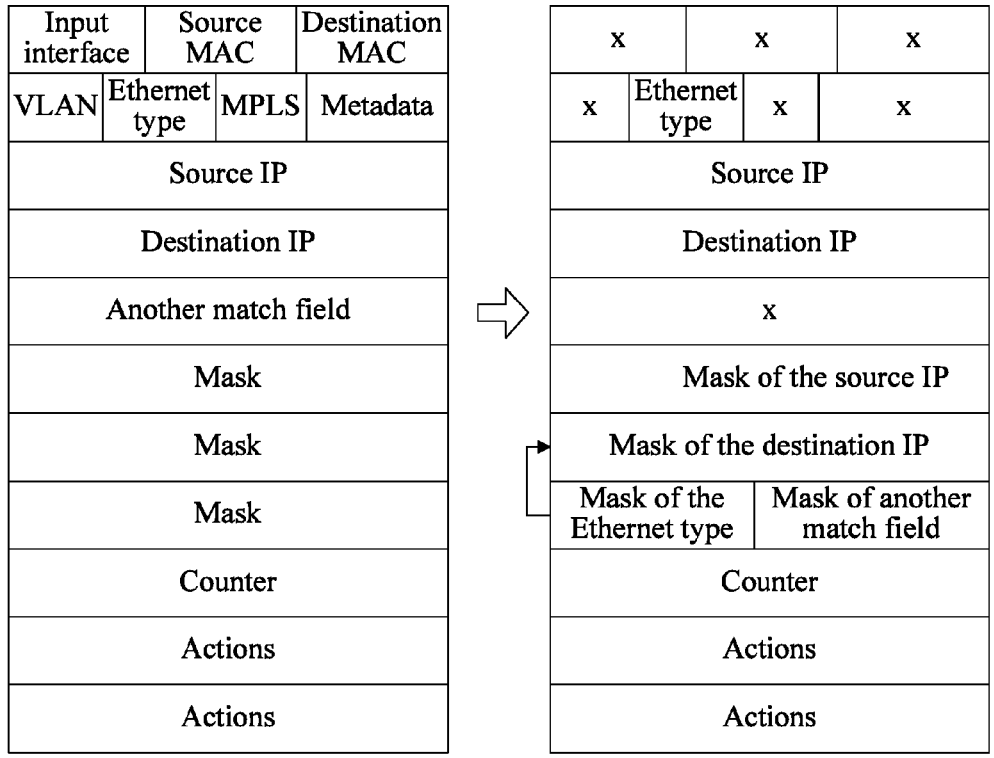
FIG. 10 is a conversion diagram of a wildcard flow rule according to an embodiment of the present disclosure.

For example, if the controller delivers a flow rule shown on the left side of FIG. 10 to the 2-level flow table in Table 1, because a flow table match field type of the 2-level flow table in Table 1 is wildcard matching, and a supported match field is source Internet Protocol (IP)+destination IP+Ethernet type, the switch device first extracts the source IP+destination IP+Ethernet type from the match field of the flow rule on the left side of FIG. 10.

806: Set a mask for a flow table match field, which does not match the target level of flow table, in the flow rule.

According to the foregoing example, after the flow table match field matching the target level of flow table is extracted from the flow rule delivered by the control device, a mask of another flow table match field is set to indifferent.

807: Store, in a memory corresponding to the target level of flow table, a flow rule that is obtained after the mask is set for the flow table match field, which does not match the target level of flow table, in the flow rule.

If the controller delivers the flow rule shown on the left side of FIG. 10 to the 2-level flow table in Table 1, the flow rule shown on the right side of FIG. 10 is finally stored in a memory corresponding to the 2-level flow table.

The embodiment shown in FIG. 8 gives a process in which an adaptation result is saved after the switch device adapts, to the target level of flow table, the flow rule delivered by the control device. Certainly, after the flow rule is adapted and saved, the switch device further needs to perform searching processing on a received data packet, and for details, reference may be made to the method of adaptation and saving of the flow rule, and details are not repeatedly described in this embodiment of the present disclosure.

This embodiment of the present disclosure provides a method for configuring a flow table in an OpenFlow network. The method includes determining, by a control device, a type of a service needing to be forwarded by a switch device; determining, according to the type of the service needing to be forwarded by the switch device and a prestored correspondence between a service type and flow table matching capability information, flow table matching capability information corresponding to the service type; and sending a flow table configuration message to the switch device; and receiving, by the switch device, the flow table configuration message sent by the control device, and configuring, in the switch device according to the flow table matching capability information that corresponds to the type of the service needing to be forwarded by the switch device and is carried in the flow table configuration message, a flow table corresponding to the type of the service needing to be forwarded by the switch device.

Based on the descriptions of the method for configuring a flow table in an OpenFlow network provided in the foregoing embodiment, in the method, when an application scenario of a switch device changes, and consequently a type of a service needing to be forwarded by the switch device changes and therefore a flow table match field currently configured in the switch device cannot satisfy the changed service type, a flow table is dynamically configured, so that a flow table match field configured in the switch device satisfies the service type that is obtained after the application scenario changes, thereby enhancing a service switchover adaptation capability of an entire network system, and improving the working efficiency of the system.

Embodiment 3

Figure 11:
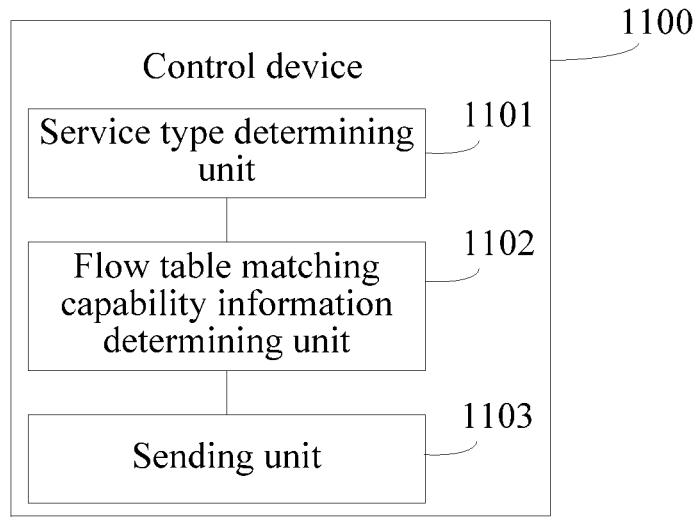
FIG. 11 shows an OpenFlow control device according to an embodiment of the present disclosure.

This embodiment of the present disclosure provides an OpenFlow control device 1100. As shown in FIG. 11, the control device 1100 includes a service type determining unit 1101, a flow table matching capability information determining unit 1102, and a sending unit 1103, where the service type determining unit 1101 is configured to determine a type of a service needing to be forwarded by a switch device, the flow table matching capability information determining unit 1102 is configured to determine, according to the type of the service needing to be forwarded by the switch device and a prestored correspondence between a service type and flow table matching capability information, flow table matching capability information corresponding to the service type, and the sending unit 1103 is configured to send a flow table configuration message to the switch device, where the flow table configuration message carries the flow table matching capability information corresponding to the service type, so that the switch device configures, according to the flow table matching capability information, a flow table required for the service type.

Further, the flow table matching capability information may include the number of flow table levels corresponding to the service type, the number of entries in each level of flow table, and a flow table match field type of each level of flow table.

Figure 12:
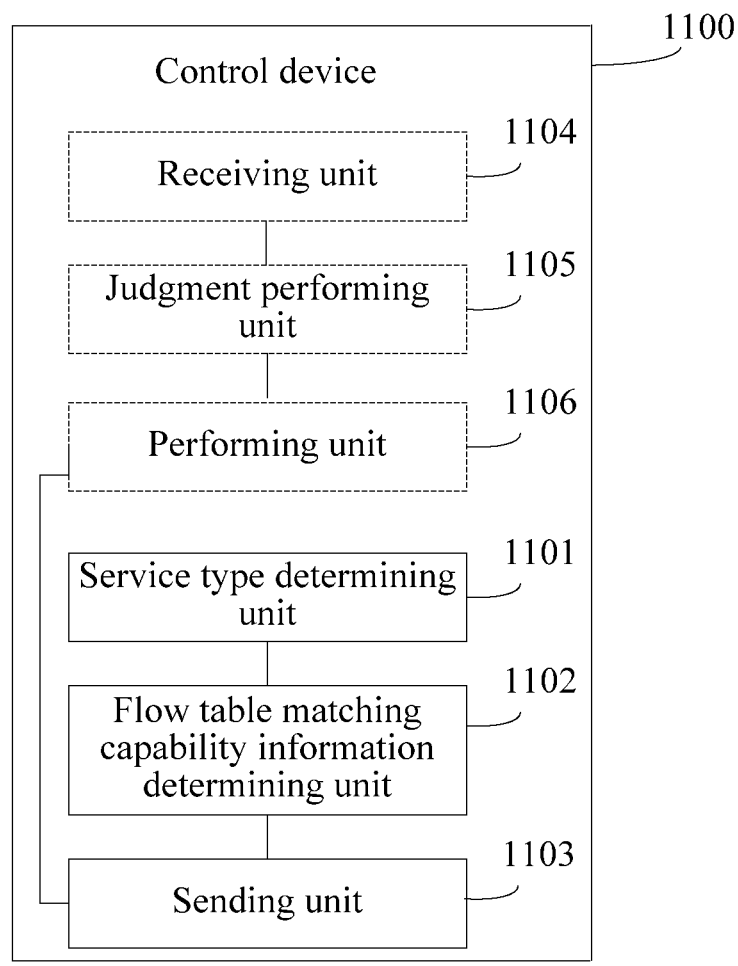
FIG. 12 shows another OpenFlow control device according to an embodiment of the present disclosure.

Further, as shown in FIG. 12, the control device 1100 may include a receiving unit 1104, a judgment performing unit 1105, and a performing unit 1106, where the receiving unit 1104 is further configured to, before the sending unit 1103 sends the flow table configuration message to the switch device, receive a flow table match field type, currently configured in the switch device and sent by the switch device, of each level of flow table, the judgment performing unit 1105 is configured to determine whether the flow table match field type, currently configured in the switch device, of each level of flow table is consistent with a flow table match field type, corresponding to the service type, of each level of flow table, and the performing unit 1106 is configured to, if the flow table match field type, currently configured in the switch device, of each level of flow table is inconsistent with the flow table match field type, corresponding to the service type, of each level of flow table, perform the step of sending a flow table configuration message to the switch device.

Figure 13:
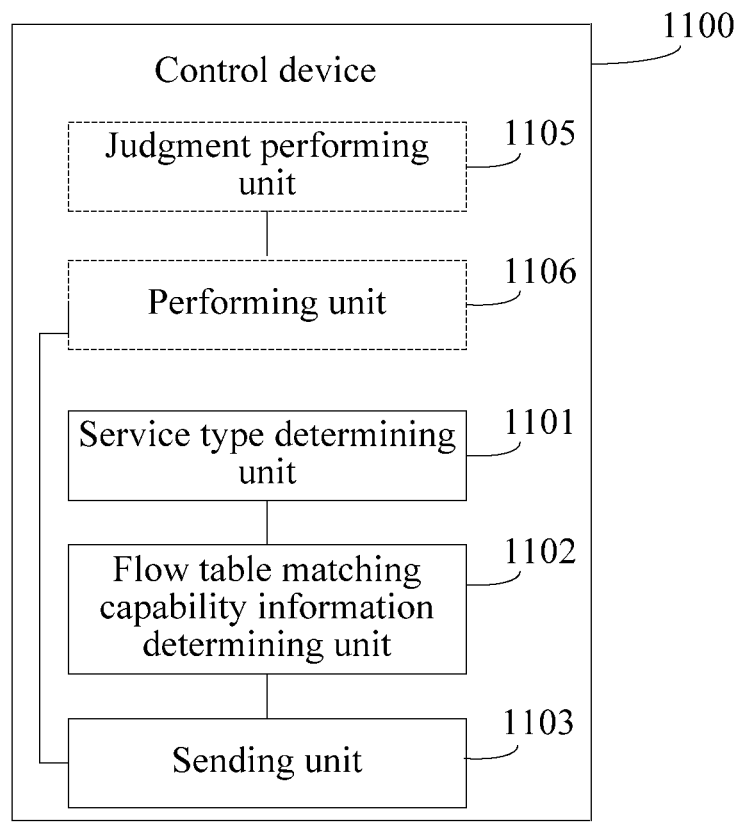
FIG. 13 shows still another OpenFlow control device according to an embodiment of the present disclosure.

Optionally, as shown in FIG. 13, the control device 1100 may further include a judgment performing unit 1105 and a performing unit 1106, where the judgment performing unit 1105 is configured to, before the sending unit 1103 sends the flow table configuration message to the switch device, determine whether a flow table match field type, corresponding to the service type, of each level of flow table is a flow table match field type that can be supported by a corresponding level of flow table in the switch device, and the performing unit 1106 is configured to, if the flow table match field type, corresponding to the service type, of each level of flow table is the flow table match field type that can be supported by the corresponding level of flow table in the switch device, perform the step of sending a flow table configuration message to the switch device.

Optionally, as shown in FIG. 12, the control device 1100 may further include a receiving unit 1104, a judgment performing unit 1105, and a performing unit 1106, where the receiving unit 1104 is configured to, before the sending unit 1103 sends the flow table configuration message to the switch device, receive a flow table match field type, currently configured in the switch device and sent by the switch device, of each level of flow table, the judgment performing unit 1105 is configured to determine whether the flow table match field type, currently configured in the switch device, of each level of flow table is consistent with a flow table match field type, corresponding to the service type, of each level of flow table, and if the flow table match field type, currently configured in the switch device, of each level of flow table is inconsistent with the flow table match field type, corresponding to the service type, of each level of flow table, determine whether the flow table match field type, corresponding to the service type, of each level of flow table is a flow table match field type that can be supported by a corresponding level of flow table in the switch device, and the performing unit 1106 is configured to, if the flow table match field type, corresponding to the service type, of each level of flow table is the flow table match field type that can be supported by the corresponding level of flow table in the switch device, perform the step of sending a flow table configuration message to the switch device.

Optionally, as shown in FIG. 12, the control device 1100 may further include a receiving unit 1104, a judgment performing unit 1105, and a performing unit 1106, where the receiving unit 1104 is configured to, before the sending unit 1103 sends the flow table configuration message to the switch device, receive a flow table match field type, currently configured in the switch device and sent by the switch device, of each level of flow table, the judgment performing unit 1105 is configured to determine whether a flow table match field type, corresponding to the service type, of each level of flow table is a flow table match field type that can be supported by a corresponding level of flow table in the switch device, and if the flow table match field type, corresponding to the service type, of each level of flow table is the flow table match field type that can be supported by the corresponding level of flow table in the switch device, determine whether the flow table match field type, currently configured in the switch device, of each level of flow table is consistent with the flow table match field type, corresponding to the service type, of each level of flow table, and the performing unit 1106 is configured to, if the flow table match field type, currently configured in the switch device, of each level of flow table is inconsistent with the flow table match field type, corresponding to the service type, of each level of flow table, perform the step of sending a flow table configuration message to the switch device.

Further, a flow table match field type that can be supported by each level of flow table in the switch device is prestored in the control device 1100, and the determining, by the judgment performing unit 1105, whether a flow table match field type, corresponding to the service type, of each level of flow table is a flow table match field type that can be supported by a corresponding level of flow table in the switch device includes determining, according to the prestored flow table match field type that can be supported by each level of flow table in the switch device, whether the flow table match field type, corresponding to the service type, of each level of flow table is the flow table match field type that can be supported by the corresponding level of flow table in the switch device.

Optionally, the receiving unit 1104 is further configured to, before the judgment performing unit 1105 determines whether the flow table match field type, corresponding to the service type, of each level of flow table is the flow table match field type that can be supported by the corresponding level of flow table in the switch device, receive a flow table match field type that can be supported by each level of flow table in the switch device, and the determining, by the judgment performing unit 1105, whether a match field type, corresponding to the service type, of each level of flow table is a flow table match field type that can be supported by a corresponding level of flow table in the switch device includes determining, according to the flow table match field type that can be supported by each level of flow table in the switch device and that is sent by the switch device, whether the flow table match field type, corresponding to the service type, of each level of flow table is the flow table match field type that can be supported by the corresponding level of flow table in the switch device.

Further, the sending unit 1103 is configured to, after sending the flow table configuration message to the switch device, send a first indication message to the switch device, where the first indication message carries a flow rule delivered by the control device 1100 and information about a target level of flow table corresponding to the flow rule, the first indication message instructs the switch device to adapt the flow rule, delivered by the control device, to the target level of flow table 1100 and save an adaptation result, and the target level of flow table is a level of flow table in which the adaptation result is to be saved.

For the method for configuring a flow table in an OpenFlow network by the control device 1100, reference may be made to the descriptions of Embodiment 1 and Embodiment 2, and details are not repeatedly described in this embodiment of the present disclosure.

This embodiment of the present disclosure provides an OpenFlow control device. The control device includes a service type determining unit, a flow table matching capability information determining unit, and a sending unit. The service type determining unit is configured to determine a type of a service needing to be forwarded by a switch device; the flow table matching capability information determining unit is configured to determine, according to the type of the service needing to be forwarded by the switch device and a prestored correspondence between a service type and flow table matching capability information, flow table matching capability information corresponding to the service type; and the sending unit is configured to send a flow table configuration message to the switch device, where the flow table configuration message carries the flow table matching capability information corresponding to the service type, so that the switch device configures, according to the flow table matching capability information, a flow table required for the service type.

Based on the OpenFlow control device provided in this embodiment of the present disclosure, when an application scenario of a switch device changes, and consequently a type of a service needing to be forwarded by the switch device changes and therefore a flow table match field currently configured in the switch device cannot satisfy the changed service type, by using the control device, a flow table is dynamically configured, so that a flow table match field configured in the switch device satisfies the service type that is obtained after the application scenario changes, thereby enhancing a service switchover adaptation capability of an entire network system, and improving the working efficiency of the system.

Embodiment 4

Figure 14:
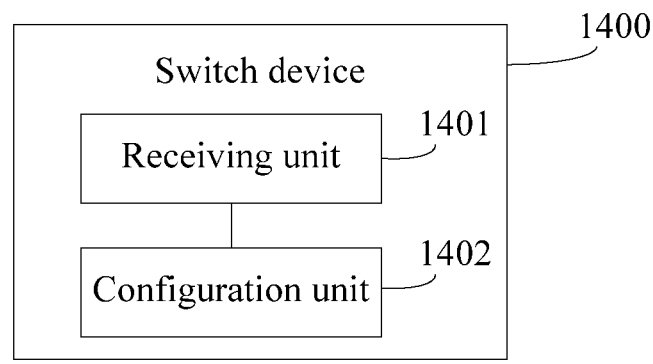
FIG. 14 shows an OpenFlow switch device according to an embodiment of the present disclosure.

This embodiment of the present disclosure provides an OpenFlow switch device 1400. As shown in FIG. 14, the switch device 1400 includes a receiving unit 1401 and a configuration unit 1402, where the receiving unit 1401 is configured to receive a flow table configuration message sent by a control device, where the flow table configuration message carries flow table matching capability information corresponding to a type of a service needing to be forwarded by the switch device 1400, and the configuration unit 1402 is configured to configure, in the switch device 1400 according to the flow table matching capability information corresponding to the type of the service needing to be forwarded, a flow table corresponding to the type of the service needing to be forwarded by the switch device 1400.

Further, the flow table matching capability information may include the number of flow table levels corresponding to the service type, the number of entries in each level of flow table, and a flow table match field type of each level of flow table.

Figure 15:
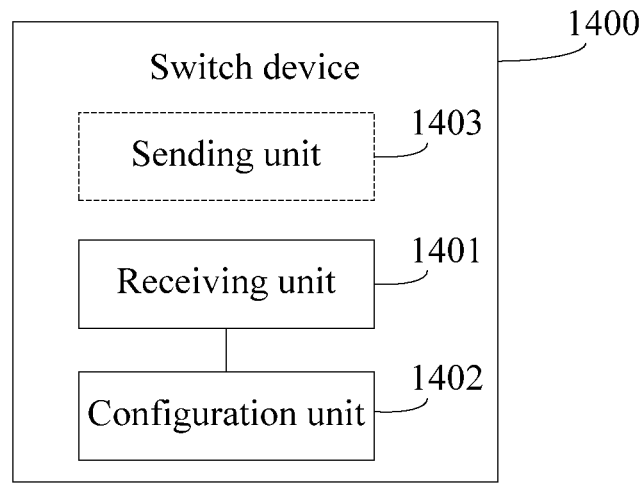
FIG. 15 shows another OpenFlow switch device according to an embodiment of the present disclosure.

Further, as shown in FIG. 15, the switch device 1400 may include a sending unit 1403, where the sending unit 1403 is configured to, before the receiving unit 1401 receives the flow table configuration message sent by the control device, send a flow table match field type, currently configured in the switch device 1400, of each level of flow table to the control device, so that the control device determines whether the flow table match field type, currently configured in the switch device 1400, of each level of flow table is consistent with a flow table match field type, corresponding to the type of the service needing to be forwarded by the switch device 1400, of each level of flow table, and the control device sends the flow table configuration message when the flow table match field type, currently configured in the switch device 1400, of each level of flow table is inconsistent with the flow table match field type, corresponding to the type of the service needing to be forwarded by the switch device 1400, of each level of flow table.

Optionally, as shown in FIG. 15, the switch device 1400 may further include a sending unit 1403, where the sending unit 1403 is configured to, before the receiving unit 1401 receives the flow table configuration message sent by the control device, send a flow table match field type that can be supported by each level of flow table in the switch device 1400 to the control device, so that the control device determines whether a flow table match field type, corresponding to the type of the service needing to be forwarded by the switch device 1400, of each level of flow table is a flow table match field type that can be supported by a corresponding level of flow table in the switch device 1400, and the control device sends the flow table configuration message when the flow table match field type, corresponding to the type of the service needing to be forwarded by the switch device 1400, of each level of flow table is the flow table match field type that can be supported by the corresponding level of flow table in the switch device 1400.

Optionally, as shown in FIG. 15, the switch device 1400 may further include a sending unit 1403, where the sending unit 1403 is configured to send a flow table match field type, currently configured in the switch device 1400, of each level of flow table and a flow table match field type that can be supported by each level of flow table in the switch device 1400 to the control device, so that the control device determines whether the flow table match field type, currently configured in the switch device 1400, of each level of flow table is consistent with a match field type, corresponding to the type of the service needing to be forwarded by the switch device 1400, of each level of flow table; when the flow table match field type, currently configured in the switch device 1400, of each level of flow table is inconsistent with the flow table match field type, corresponding to the type of the service needing to be forwarded by the switch device 1400, of each level of flow table, the control device determines whether the flow table match field type, corresponding to the type of the service needing to be forwarded by the switch device 1400, of each level of flow table is a flow table match field type that can be supported by a corresponding level of flow table in the switch device 1400; and the control device sends the flow table configuration message when the flow table match field type, corresponding to the type of the service needing to be forwarded by the switch device 1400, of each level of flow table is the flow table match field type that can be supported by the corresponding level of flow table in the switch device 1400, or, the sending unit 1403 is configured to send a flow table match field type, currently configured in the switch device 1400, of each level of flow table and a flow table match field type that can be supported by each level of flow table in the switch device 1400 to the control device, so that the control device determines whether a flow table match field type, corresponding to the type of the service needing to be forwarded by the switch device 1400, of each level of flow table is a flow table match field type that can be supported by a corresponding level of flow table in the switch device 1400; when the flow table match field type, corresponding to the type of the service needing to be forwarded by the switch device 1400, of each level of flow table is the flow table match field type that can be supported by the corresponding level of flow table in the switch device 1400, the control device determines whether the flow table match field type, currently configured in the switch device 1400, of each level of flow table is consistent with the flow table match field type, corresponding to the type of the service needing to be forwarded by the switch device 1400, of each level of flow table; and the control device sends the flow table configuration message when the flow table match field type, currently configured in the switch device 1400, of each level of flow table is inconsistent with the flow table match field type, corresponding to the type of the service needing to be forwarded by the switch device 1400, of each level of flow table.

Further, the configuring, by the configuration unit 1402 in the switch device 1400 according to the flow table matching capability information corresponding to the type of the service needing to be forwarded, a flow table corresponding to the type of the service needing to be forwarded by the switch device 1400 includes clearing flow table content currently configured in the switch device 1400, and releasing flow table storage resources, and re-allocating and mapping the flow table storage resources according to the flow table matching capability information corresponding to the type of the service needing to be forwarded.

Figure 16:
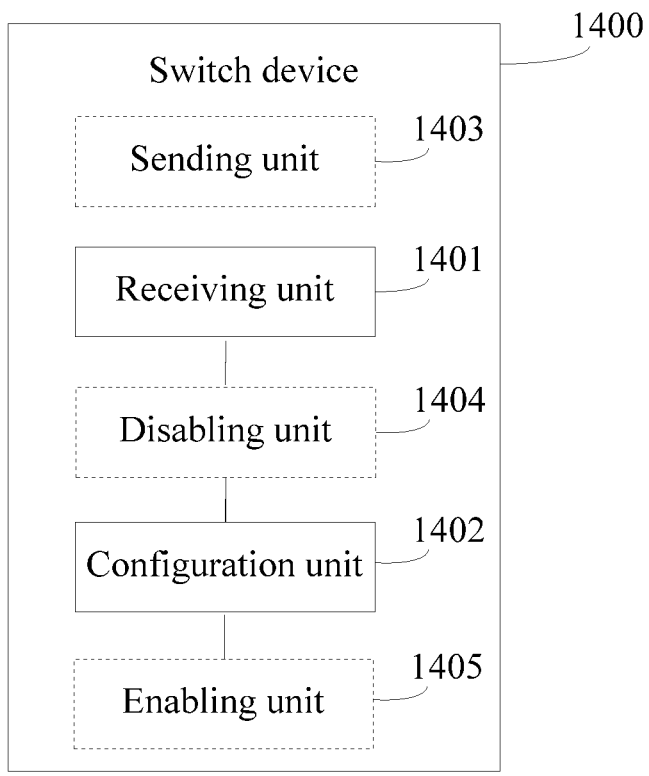
FIG. 16 shows still another OpenFlow switch device according to an embodiment of the present disclosure.

Further, as shown in FIG. 16, the switch device 1400 may further include a disabling unit 1404 and an enabling unit 1405, where the disabling unit 1404 is configured to, after the receiving unit 1401 receives the flow table configuration message sent by the control device, and before the configuration unit 1402 configures, in the switch device 1400 according to the flow table matching capability information corresponding to the type of the service needing to be forwarded, the flow table corresponding to the type of the service needing to be forwarded by the switch device 1400, disable a forwarding service port, where the forwarding service port is used for forwarding a service data packet corresponding to the type of the service needing to be forwarded by the switch device, and the enabling unit 1405 is configured to, after the configuration unit 1402 configures, in the switch device 1400 according to the flow table matching capability information corresponding to the type of the service needing to be forwarded, the flow table corresponding to the type of the service needing to be forwarded by the switch device 1400, enable the forwarding service port.

Figure 17:
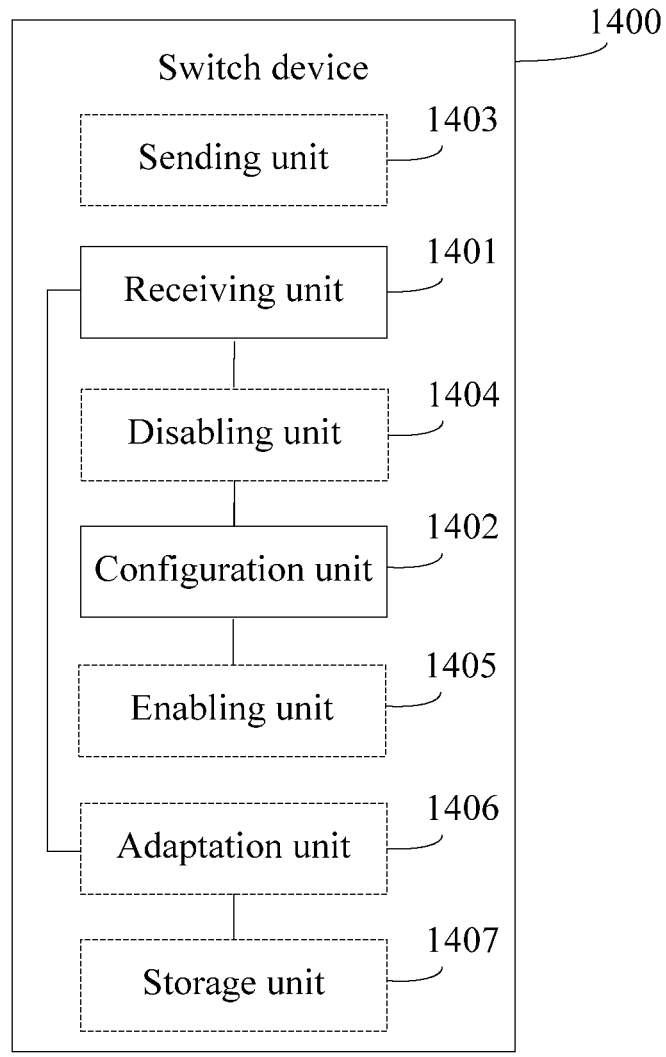
FIG. 17 shows yet another OpenFlow switch device according to an embodiment of the present disclosure.

Further, as shown in FIG. 17, the switch device 1400 may include an adaptation unit 1406 and a storage unit 1407, where the receiving unit 1401 is further configured to: after the configuration unit 1402 configures, in the switch device 1400 according to the flow table matching capability information corresponding to the type of the service needing to be forwarded, the flow table corresponding to the type of the service needing to be forwarded by the switch device 1400, receive a first indication message sent by the control device, where the first indication message carries a flow rule delivered by the control device and information about a target level of flow table corresponding to the flow rule, the first indication message instructs the switch device 1400 to adapt, to the target level of flow table, the flow rule delivered by the control device and save an adaptation result, and the target level of flow table is a level of flow table in which the adaptation result is to be saved, the adaptation unit 1406 is configured to adapt the flow rule, which is carried in the first indication message sent by the control device, to the target level of flow table, and the storage unit 1407 is configured to store the adaptation result.

Further, the first indication message carries a type of the flow rule, where the type of the flow rule includes a precise flow rule or a wildcard flow rule, the adapting, by the adaptation unit 1406 to the target level of flow table, the flow rule carried in the first indication message sent by the control device includes determining, according to the type of the flow rule carried in the first indication message, whether the flow rule is a precise flow rule or a wildcard flow rule, if the flow rule is a precise flow rule, extracting a flow table match field matching the target level of flow table from the flow rule according to a currently configured flow table match field type of the target level of flow table, and re-arranging, according to a storage structure of the target level of flow table, the flow table match field matching the target level of flow table, and the storing, by the storage unit 1407, the adaptation result includes correspondingly storing, in a memory corresponding to the target level of flow table, the arranged flow table match field matching the target level of flow table and other information of the flow rule.

Optionally, the first indication message further carries a type of the flow rule, where the type of the flow rule includes a precise flow rule or a wildcard flow rule, the adapting, by the adaptation unit 1406 to the target level of flow table, the flow rule carried in the first indication message sent by the control device includes determining, according to the type of the flow rule carried in the first indication message, whether the flow rule is a precise flow rule or a wildcard flow rule, if the flow rule is a wildcard flow rule, extracting a flow table match field matching the target level of flow table from the flow rule according to a currently configured flow table match field type of the target level of flow table, and setting a mask for a flow table match field, which does not match the target level of flow table, in the flow rule, and the storing, by the storage unit 1407, the adaptation result includes storing, in a memory corresponding to the target level of flow table, a flow rule that is obtained after the mask is set for the flow table match field, which does not match the target level of flow table, in the flow rule.

For the method for configuring a flow table in an OpenFlow network by the switch device 1400, reference may be made to the descriptions of Embodiment 1 and Embodiment 2, and details are not repeatedly described in this embodiment of the present disclosure.

This embodiment of the present disclosure provides an OpenFlow switch device. The switch device includes a receiving unit and a configuration unit. The receiving unit is configured to receive a flow table configuration message sent by a control device, where the flow table configuration message carries flow table matching capability information corresponding to a type of a service needing to be forwarded by the switch device; and the configuration unit is configured to configure, in the switch device according to the flow table matching capability information corresponding to the type of the service needing to be forwarded, a flow table corresponding to the type of the service needing to be forwarded by the switch device.

Based on the OpenFlow switch device provided in this embodiment of the present disclosure, when an application scenario changes, and consequently a type of a service needing to be forwarded changes and therefore a currently configured flow table match field cannot satisfy the changed service type, by using the switch device, a flow table is dynamically configured, so that a flow table match field after configuration satisfies the service type that is obtained after the application scenario changes, thereby enhancing a service switchover adaptation capability of an entire network system, and improving the working efficiency of the system.

Embodiment 5

Figure 18:
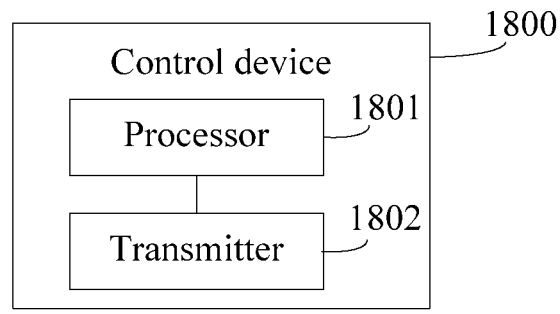
FIG. 18 shows an OpenFlow control device according to an embodiment of the present disclosure.

This embodiment of the present disclosure provides an OpenFlow control device 1800. As shown in FIG. 18, the control device 1800 includes a processor 1801 and a transmitter 1802, where the processor 1801 is configured to determine a type of a service needing to be forwarded by a switch device, the processor 1801 is further configured to determine, according to the type of the service needing to be forwarded by the switch device and a prestored correspondence between a service type and flow table matching capability information, flow table matching capability information corresponding to the service type, and the transmitter 1802 is configured to send a flow table configuration message to the switch device, where the flow table configuration message carries the flow table matching capability information corresponding to the service type, so that the switch device configures, according to the flow table matching capability information, a flow table required for the service type.

Further, the flow table matching capability information includes the number of flow table levels corresponding to the service type, the number of entries in each level of flow table, and a flow table match field type of each level of flow table.

Figure 19:
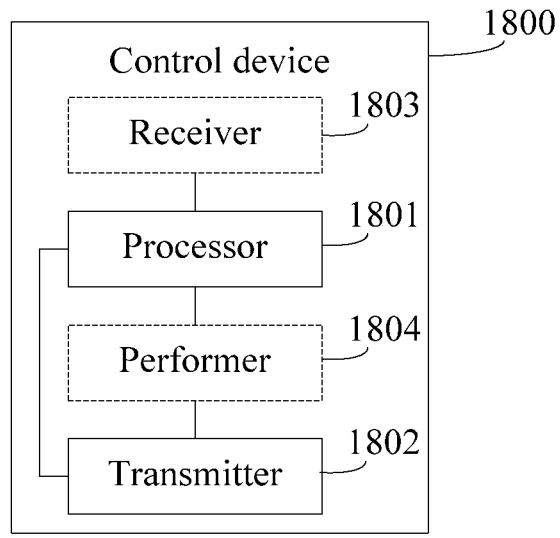
FIG. 19 shows another OpenFlow control device according to an embodiment of the present disclosure.

Further, as shown in FIG. 19, the control device 1800 may include a receiver 1803 and a performer 1804, where the receiver 1803 is configured to, before the transmitter 1802 sends the flow table configuration message to the switch device, receive a flow table match field type, currently configured in the switch device and sent by the switch device, of each level of flow table, the processor 1801 is further configured to determine whether the flow table match field type, currently configured in the switch device, of each level of flow table is consistent with a flow table match field type, corresponding to the service type, of each level of flow table, and the performer 1804 is configured to, if the flow table match field type, currently configured in the switch device, of each level of flow table is inconsistent with the flow table match field type, corresponding to the service type, of each level of flow table, perform the step of sending a flow table configuration message to the switch device.

Figure 20:
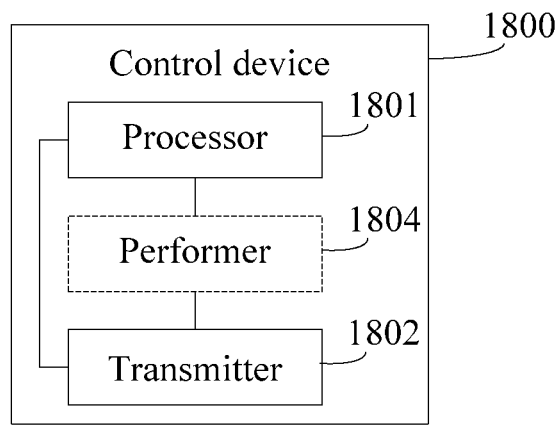
FIG. 20 shows still another OpenFlow control device according to an embodiment of the present disclosure.

Optionally, as shown in FIG. 20, the control device 1800 may further include a performer 1804, where the processor 1801 is configured to, before the transmitter 1802 sends the flow table configuration message to the switch device, determine whether a flow table match field type, corresponding to the service type, of each level of flow table is a flow table match field type that can be supported by a corresponding level of flow table in the switch device, and the performer 1804 is configured to: if the flow table match field type, corresponding to the service type, of each level of flow table is the flow table match field type that can be supported by the corresponding level of flow table in the switch device, perform the step of sending a flow table configuration message to the switch device.

Optionally, as shown in FIG. 19, the control device 1800 may further include a receiver 1803 and a performer 1804, where the receiver 1803 is configured to, before the transmitter 1802 sends the flow table configuration message to the switch device, receive a flow table match field type, currently configured in the switch device and sent by the switch device, of each level of flow table, the processor 1801 is configured to determine whether the flow table match field type, currently configured in the switch device, of each level of flow table is consistent with a flow table match field type, corresponding to the service type, of each level of flow table, and if the flow table match field type, currently configured in the switch device, of each level of flow table is inconsistent with the flow table match field type, corresponding to the service type, of each level of flow table, determine whether the flow table match field type, corresponding to the service type, of each level of flow table is a flow table match field type that can be supported by a corresponding level of flow table in the switch device, and the performer 1804 is configured to, if the flow table match field type, corresponding to the service type, of each level of flow table is the flow table match field type that can be supported by the corresponding level of flow table in the switch device, perform the step of sending a flow table configuration message to the switch device.

Optionally, as shown in FIG. 19, the control device 1800 may further include a receiver 1803 and a performer 1804, where the receiver 1803 is configured to, before the transmitter 1802 sends the flow table configuration message to the switch device, receive a flow table match field type, currently configured in the switch device and sent by the switch device, of each level of flow table, the processor 1801 is configured to determine whether a flow table match field type, corresponding to the service type, of each level of flow table is a flow table match field type that can be supported by a corresponding level of flow table in the switch device, and if the flow table match field type, corresponding to the service type, of each level of flow table is the flow table match field type that can be supported by the corresponding level of flow table in the switch device, determine whether the flow table match field type, currently configured in the switch device, of each level of flow table is consistent with the flow table match field type, corresponding to the service type, of each level of flow table, and the performer 1804 is configured to, if the flow table match field type, currently configured in the switch device, of each level of flow table is inconsistent with the flow table match field type, corresponding to the service type, of each level of flow table, perform the step of sending a flow table configuration message to the switch device.

Further, a flow table match field type that can be supported by each level of flow table in the switch device is prestored in the control device 1800, and the determining, by the processor 1801, whether a flow table match field type, corresponding to the service type, of each level of flow table is a flow table match field type that can be supported by a corresponding level of flow table in the switch device includes determining, according to the prestored flow table match field type that can be supported by each level of flow table in the switch device, whether the flow table match field type, corresponding to the service type, of each level of flow table is the flow table match field type that can be supported by the corresponding level of flow table in the switch device.

Optionally, the receiver 1803 is further configured to, before the processor 1801 determines whether the flow table match field type, corresponding to the service type, of each level of flow table is the flow table match field type that can be supported by the corresponding level of flow table in the switch device, receive a flow table match field type that can be supported by each level of flow table in the switch device and that is sent by the switch device, and the determining, by the processor 1801, whether a match field type, corresponding to the service type, of each level of flow table is a flow table match field type that can be supported by a corresponding level of flow table in the switch device includes determining, according to the flow table match field type that can be supported by each level of flow table in the switch device and that is sent by the switch device, whether the flow table match field type, corresponding to the service type, of each level of flow table is the flow table match field type that can be supported by the corresponding level of flow table in the switch device.

Further, the transmitter 1802 is configured to, after sending the flow table configuration message to the switch device, send a first indication message to the switch device, where the first indication message carries a flow rule delivered by the control device 1800 and information about a target level of flow table corresponding to the flow rule, the first indication message instructs the switch device to adapt the flow rule, delivered by the control device, to the target level of flow table 1800 and save an adaptation result, and the target level of flow table is a level of flow table in which the adaptation result is to be saved.

For the method for configuring a flow table in an OpenFlow network by the control device 1800, reference may be made to the descriptions of Embodiment 1 and Embodiment 2, and details are not repeatedly described in this embodiment of the present disclosure.

This embodiment of the present disclosure provides an OpenFlow control device. The control device includes a processor and a transmitter. The processor is configured to determine a type of a service needing to be forwarded by a switch device; the processor is further configured to determine, according to the type of the service needing to be forwarded by the switch device and a prestored correspondence between a service type and flow table matching capability information, flow table matching capability information corresponding to the service type; and the transmitter is configured to send a flow table configuration message to the switch device, where the flow table configuration message carries the flow table matching capability information corresponding to the service type, so that the switch device configures, according to the flow table matching capability information, a flow table required for the service type.

Based on the OpenFlow control device provided in this embodiment of the present disclosure, when an application scenario of a switch device changes, and consequently a type of a service needing to be forwarded by the switch device changes and therefore a flow table match field currently configured in the switch device cannot satisfy the changed service type, by using the control device, a flow table is dynamically configured, so that a flow table match field configured in the switch device satisfies the service type that is obtained after the application scenario changes, thereby enhancing a service switchover adaptation capability of an entire network system, and improving the working efficiency of the system.

Embodiment 6

Figure 21:
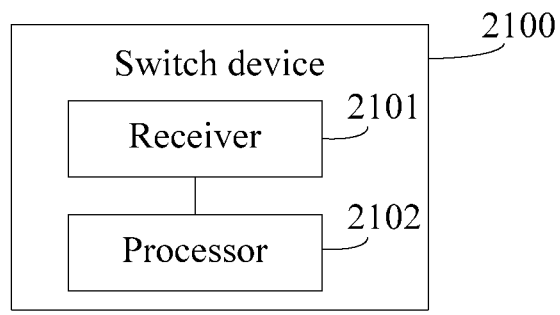
FIG. 21 shows an OpenFlow switch device according to an embodiment of the present disclosure.

This embodiment of the present disclosure provides an OpenFlow switch device 2100. As shown in FIG. 21, the switch device 2100 includes a receiver 2101 and a processor 2102, where the receiver 2101 is configured to receive a flow table configuration message sent by a control device, where the flow table configuration message carries flow table matching capability information of a flow table corresponding to a type of a service needing to be forwarded by the switch device 2100, and the processor 2102 is configured to configure, in the switch device 2100 according to the flow table matching capability information corresponding to the type of the service needing to be forwarded, a flow table corresponding to the type of the service needing to be forwarded by the switch device 2100.

Further, the flow table matching capability information may include the number of flow table levels corresponding to the service type, the number of entries in each level of flow table, and a flow table match field type of each level of flow table.

Figure 22:
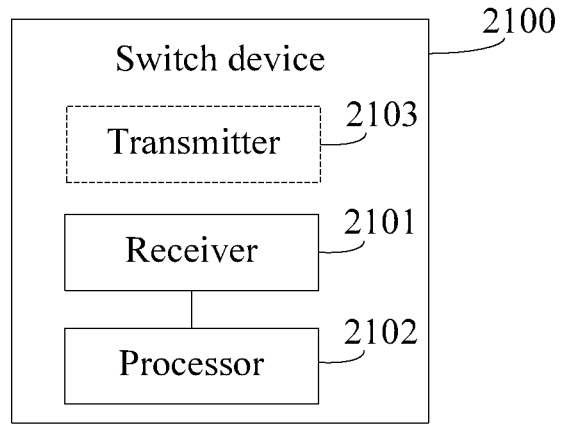
FIG. 22 shows another OpenFlow switch device according to an embodiment of the present disclosure.

Further, as shown in FIG. 22, the switch device 2100 may include a transmitter 2103, where the transmitter 2103 is configured to, before the receiver 2101 receives the flow table configuration message sent by the control device, send a flow table match field type, currently configured in the switch device 2100, of each level of flow table to the control device, so that the control device determines whether the flow table match field type, currently configured in the switch device 2100, of each level of flow table is consistent with a flow table match field type, corresponding to the type of the service needing to be forwarded by the switch device 2100, of each level of flow table, and the control device sends the flow table configuration message when the flow table match field type, currently configured in the switch device 2100, of each level of flow table is inconsistent with the flow table match field type, corresponding to the type of the service needing to be forwarded by the switch device 2100, of each level of flow table.

Optionally, as shown in FIG. 22, the switch device 2100 may further include a transmitter 2103, where the transmitter 2103 is configured to, before the receiver 2101 receives the flow table configuration message sent by the control device, send a flow table match field type that can be supported by each level of flow table in the switch device 2100 to the control device, so that the control device determines whether a flow table match field type, corresponding to the type of the service needing to be forwarded by the switch device 2100, of each level of flow table is a flow table match field type that can be supported by a corresponding level of flow table in the switch device 2100, and the control device sends the flow table configuration message when the flow table match field type, corresponding to the type of the service needing to be forwarded by the switch device 2100, of each level of flow table is the flow table match field type that can be supported by the corresponding level of flow table in the switch device 2100.

Optionally, as shown in FIG. 22, the switch device 2100 may further include a transmitter 2103, where the transmitter 2103 is configured to send a flow table match field type, currently configured in the switch device 2100, of each level of flow table and a flow table match field type that can be supported by each level of flow table in the switch device 2100 to the control device, so that the control device determines whether the flow table match field type, currently configured in the switch device 2100, of each level of flow table is consistent with a match field type, corresponding to the type of the service needing to be forwarded by the switch device 2100, of each level of flow table; when the flow table match field type, currently configured in the switch device 2100, of each level of flow table is inconsistent with the flow table match field type, corresponding to the type of the service needing to be forwarded by the switch device 2100, of each level of flow table, the control device determines whether the flow table match field type, corresponding to the type of the service needing to be forwarded by the switch device 2100, of each level of flow table is a flow table match field type that can be supported by a corresponding level of flow table in the switch device 2100; and the control device sends the flow table configuration message when the flow table match field type, corresponding to the type of the service needing to be forwarded by the switch device 2100, of each level of flow table is the flow table match field type that can be supported by the corresponding level of flow table in the switch device 2100, or, the transmitter 2103 is configured to send a flow table match field type, currently configured in the switch device 2100, of each level of flow table and a flow table match field type that can be supported by each level of flow table in the switch device 2100 to the control device, so that the control device determines whether a flow table match field type, corresponding to the type of the service needing to be forwarded by the switch device 2100, of each level of flow table is a flow table match field type that can be supported by a corresponding level of flow table in the switch device 2100; when the flow table match field type, corresponding to the type of the service needing to be forwarded by the switch device 2100, of each level of flow table is the flow table match field type that can be supported by the corresponding level of flow table in the switch device 2100, the control device determines whether the flow table match field type, currently configured in the switch device 2100, of each level of flow table is consistent with the flow table match field type, corresponding to the type of the service needing to be forwarded by the switch device 2100, of each level of flow table; and the control device sends the flow table configuration message when the flow table match field type, currently configured in the switch device 2100, of each level of flow table is inconsistent with the flow table match field type, corresponding to the type of the service needing to be forwarded by the switch device 2100, of each level of flow table.

Further, the configuring, by the processor 2102, in the switch device 2100 according to the flow table matching capability information corresponding to the type of the service needing to be forwarded, a flow table corresponding to the type of the service needing to be forwarded by the switch device 2100 includes clearing flow table content currently configured in the switch device 2100, and releasing flow table storage resources, and re-allocating and mapping the flow table storage resources according to the flow table matching capability information corresponding to the type of the service needing to be forwarded.

Further, the processor 2102 is further configured to, after the receiver 2101 receives the flow table configuration message sent by the control device, and before the processor 2102 configures, in the switch device 2100 according to the flow table matching capability information corresponding to the type of the service needing to be forwarded, the flow table corresponding to the type of the service needing to be forwarded by the switch device 2100, disable a forwarding service port, where the forwarding service port is used for forwarding a service data packet corresponding to the type of the service needing to be forwarded by the switch device.

The processor 2102 is further configured to, after configuring, in the switch device 2100 according to the flow table matching capability information corresponding to the type of the service needing to be forwarded, the flow table corresponding to the type of the service needing to be forwarded by the switch device 2100, enable the forwarding service port.

Figure 23:
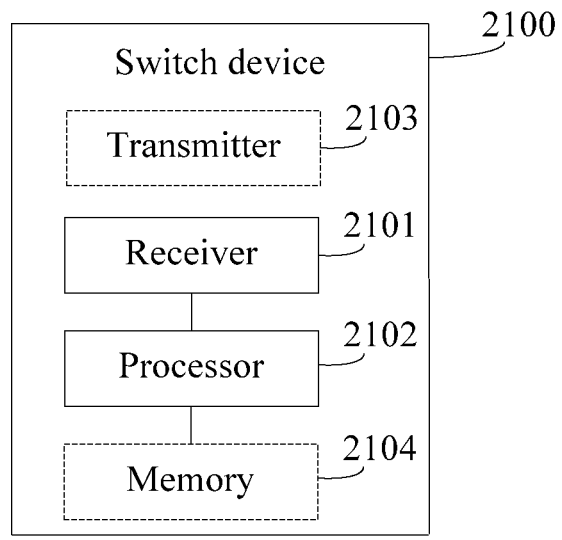
FIG. 23 shows still another OpenFlow switch device according to an embodiment of the present disclosure.

Further, as shown in FIG. 23, the switch device 2100 may further include a memory 2104, where the receiver 2101 is further configured to, after the processor 2102 configures, in the switch device 2100 according to the flow table matching capability information corresponding to the type of the service needing to be forwarded, the flow table corresponding to the type of the service needing to be forwarded by the switch device 2100, receive a first indication message sent by the control device, where the first indication message carries a flow rule delivered by the control device and information about a target level of flow table corresponding to the flow rule, the first indication message instructs the switch device 2100 to adapt, to the target level of flow table, the flow rule delivered by the control device and save an adaptation result, and the target level of flow table is a level of flow table in which the adaptation result is to be saved, the processor 2102 is configured to adapt the flow rule, which is carried in the first indication message sent by the control device, to the target level of flow table, and the memory 2104 is configured to store the adaptation result.

Further, the first indication message carries a type of the flow rule, where the type of the flow rule includes a precise flow rule or a wildcard flow rule, the adapting, by the processor 2102 to the target level of flow table, the flow rule carried in the first indication message sent by the control device includes determining, according to the type of the flow rule carried in the first indication message, whether the flow rule is a precise flow rule or a wildcard flow rule, if the flow rule is a precise flow rule, extracting a flow table match field matching the target level of flow table from the flow rule according to a currently configured flow table match field type of the target level of flow table, and re-arranging, according to a storage structure of the target level of flow table, the flow table match field matching the target level of flow table, and the storing, by the memory 2104, the adaptation result includes correspondingly storing, in the memory 2104 corresponding to the target level of flow table, the arranged flow table match field that matches the target level of flow table and other information of the flow rule.

Optionally, the first indication message further carries a type of the flow rule, where the type of the flow rule includes a precise flow rule or a wildcard flow rule, the adapting, by the processor 2102 to the target level of flow table, the flow rule carried in the first indication message sent by the control device includes determining, according to the type of the flow rule carried in the first indication message, whether the flow rule is a precise flow rule or a wildcard flow rule, if the flow rule is a wildcard flow rule, extracting a flow table match field matching the target level of flow table from the flow rule according to a currently configured flow table match field type of the target level of flow table, and setting a mask for a flow table match field, which does not match the target level of flow table, in the flow rule, and the storing, by the memory 2104, the adaptation result includes storing, in the memory 2104 corresponding to the target level of flow table, a flow rule that is obtained after the mask is set for the flow table match field, which does not match the target level of flow table, in the flow rule.

For the method for configuring a flow table in an OpenFlow network by the switch device 2100, reference may be made to the descriptions of Embodiment 1 and Embodiment 2, and details are not repeatedly described in this embodiment of the present disclosure.

This embodiment of the present disclosure provides an OpenFlow switch device. The switch device includes a receiver and a processor. The receiver is configured to receive a flow table configuration message sent by a control device, where the flow table configuration message carries flow table matching capability information corresponding to a type of a service needing to be forwarded by the switch device; and the processor is configured to configure, in the switch device according to the flow table matching capability information corresponding to the type of the service needing to be forwarded, a flow table corresponding to the type of the service needing to be forwarded by the switch device.

Based on the OpenFlow switch device provided in this embodiment of the present disclosure, when an application scenario changes, and consequently a type of a service needing to be forwarded changes and therefore a currently configured flow table match field cannot satisfy the changed service type, by using the switch device, a flow table is dynamically configured, so that a flow table match field after configuration satisfies the service type that is obtained after the application scenario changes, thereby enhancing a service switchover adaptation capability of an entire network system, and improving the working efficiency of the system.

Embodiment 7

Figure 24:
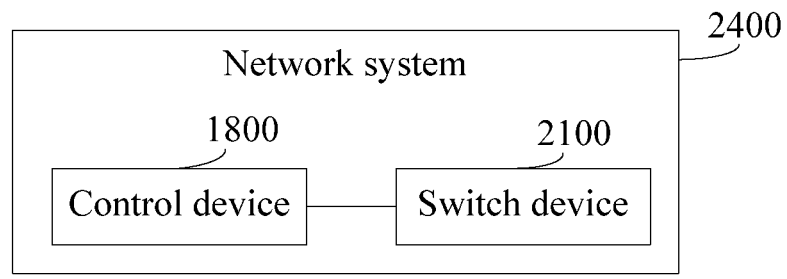
FIG. 24 shows an OpenFlow network system according to an embodiment of the present disclosure.

This embodiment of the present disclosure provides an OpenFlow network system 2400. As shown in FIG. 24, the system 2400 includes a control device 1800 and a switch device 2100, where the control device 1800 is configured to determine a type of a service needing to be forwarded by the switch device 2100, the control device 1800 is further configured to determine, according to the type of the service needing to be forwarded by the switch device 2100 and a prestored correspondence between a service type and flow table matching capability information, flow table matching capability information corresponding to the service type, the control device 1800 is further configured to send a flow table configuration message to the switch device 2100, where the flow table configuration message carries the flow table matching capability information corresponding to the service type, so that the switch device configures, according to the flow table matching capability information, a flow table required for the service type, the switch device 2100 is configured to receive the flow table configuration message sent by the control device 1800, and the switch device 2100 is further configured to configure, in the switch device 2100 according to the flow table matching capability information corresponding to the type of the service needing to be forwarded, a flow table corresponding to the type of the service needing to be forwarded.

Based on the descriptions of the foregoing embodiment, in the OpenFlow network system provided in this embodiment of the present disclosure, through interaction between the control device and the switch device, when an application scenario of the switch device changes, and consequently a type of a service needing to be forwarded by the switch device changes and therefore a flow table match field currently configured in the switch device cannot satisfy the changed service type, a flow table may be dynamically configured, so that a flow table match field configured in the switch device satisfies the service type that is obtained after the application scenario changes, thereby enhancing a service switchover adaptation capability of an entire network system, and improving the working efficiency of the system.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be implemented as one or more communications buses or signal cables. A person of ordinary skill in the art may understand and implement the embodiments of the present disclosure without creative efforts.

Based on the descriptions of the foregoing implementation manners, a person skilled in the art may clearly understand that the present disclosure may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for configuring a flow table in an OpenFlow network, wherein the method is based on an OpenFlow protocol switch device, and wherein the method comprises:
   receiving a flow table configuration message from a control device, wherein the flow table configuration message carries flow table matching capability information corresponding to a type of a service needing to be forwarded by the switch device;
   configuring, in the switch device according to the flow table matching capability information corresponding to the type of the service needing to be forwarded by the switch device, the flow table corresponding to the type of the service needing to be forwarded by the switch device;
   receiving a first indication message from the control device, wherein the first indication message carries a flow rule and a type of the flow rule delivered by the control device and information about a target level of the flow table corresponding to the flow rule, wherein the first indication message instructs the switch device to adapt the flow rule to the target level of the flow table and save an adaptation result, wherein the target level of the flow table is a level of the flow table in which the adaptation result is to be saved, and wherein the type of the flow rule comprises one of a precise flow rule and a wildcard flow rule;
   determining, according to the type of the flow rule carried in the first indication message, whether the flow rule is one of the precise flow rule and the wildcard flow rule;
   extracting a flow table match field matching the target level of the flow table from the flow rule according to a currently configured flow table match field type of the target level of the flow table when the flow rule is the precise flow rule;
   re-arranging, according to a storage structure of the target level of the flow table, the flow table match field matching the target level of the flow table; and
   storing, in a memory corresponding to the target level of the flow table, the flow table match field matching the target level of the flow table and other information of the flow rule.

2. The method according to claim 1, wherein the flow table matching capability information comprises:
   a number of flow table levels corresponding to the type of the service;
   a number of entries in each level of the flow table; and
   a flow table match field type of each level of the flow table.

3. The method according to claim 2, wherein before receiving the flow table configuration message from the control device, the method further comprises sending a flow table match field type that can be supported by each level of the flow table in the switch device to the control device, so that the control device determines whether the flow table match field type, corresponding to the type of the service needing to be forwarded by the switch device, of each level of the flow table can be supported by a corresponding level of the flow table in the switch device, and
   wherein the control device sends the flow table configuration message when the flow table match field type, corresponding to the type of the service needing to be forwarded by the switch device, of each level of the flow table can be supported by the corresponding level of the flow table in the switch device.

4. The method according to claim 1, further comprising:
   extracting a flow table match field matching the target level of the flow table from the flow rule according to a currently configured flow table match field type of the target level of the flow table when the flow rule is the wildcard flow rule;
   setting a mask for the flow table match field, which does not match the target level of the flow table, in the flow rule; and
   storing, in a memory corresponding to the target level of the flow table, a flow rule that is obtained after the mask is set for the flow table match field, which does not match the target level of the flow table, in the flow rule.

5. An OpenFlow switch device, wherein the switch device comprises:
   a receiver configured to receive a flow table configuration message from a control device, wherein the flow table configuration message carries flow table matching capability information corresponding to a type of a service needing to be forwarded by the switch device;
a memory configured to store an adaptation result; and
a processor coupled to the receiver and the memory and configured to configure, in the switch device according to the flow table matching capability information corresponding to the type of the service needing to be forwarded, a flow table corresponding to the type of the service needing to be forwarded by the switch device,
wherein the receiver is further configured to receive a first indication message from the control device after the processor configures, in the switch device according to the flow table matching capability information corresponding to the type of the service needing to be forwarded, the flow table corresponding to the type of the service needing to be forwarded by the switch device,
wherein the first indication message carries a flow rule and a type of the flow rule delivered by the control device and information about a target level of the flow table corresponding to the flow rule,
wherein the first indication message instructs the switch device to adapt the flow rule to the target level of the flow table and save the adaptation result,
wherein the target level of the flow table is a level of the flow table in which the adaptation result is to be saved,
wherein the type of the flow rule comprises one of a precise flow rule and a wildcard flow rule, and
wherein the processor is further configured to:
  determine, according to the type of the flow rule carried in the first indication message, whether the flow rule is one of the precise flow rule and the wildcard flow rule;
  extract a flow table match field matching the target level of the flow table from the flow rule according to a currently configured flow table match field type of the target level of the flow table when the flow rule is the precise flow rule; and
  re-arrange, according to a storage structure of the target level of the flow table, the flow table match field matching the target level of the flow table, wherein storing, by the memory, the adaptation result comprises storing, in a portion of the memory corresponding to the target level of the flow table, the flow table match field matching the target level of the flow table and other information of the flow rule correspondingly.

6. The switch device according to claim 5, wherein the flow table matching capability information comprises:
  a number of flow table levels corresponding to the type of the service;
  a number of entries in each level of the flow table; and
  a flow table match field type of each level of the flow table.

7. The switch device according to claim 6, wherein the switch device further comprises a transmitter, wherein the transmitter is configured to send a flow table match field type that can be supported by each level of the flow table in the switch device to the control device before the receiver receives the flow table configuration message from the control device, so that the control device determines whether the flow table match field type, corresponding to the type of the service needing to be forwarded by the switch device, of each level of the flow table can be supported by a corresponding level of the flow table in the switch device, and wherein the control device sends the flow table configuration message when the flow table match field type, corresponding to the type of the service needing to be forwarded by the switch device, of each level of the flow table can be supported by the corresponding level of the flow table in the switch device.

8. The switch device according to claim 5, wherein the processor is further configured to:
  extract a flow table match field matching the target level of the flow table from the flow rule according to a currently configured flow table match field type of the target level of the flow table when the flow rule is the wildcard flow rule; and
  set a mask for the flow table match field, which does not match the target level of the flow table, in the flow rule, wherein storing, by the memory, the adaptation result comprises storing, in a portion of the memory corresponding to the target level of the flow table, a flow rule that is obtained after the mask is set for the flow table match field, which does not match the target level of the flow table, in the flow rule.

9. An OpenFlow network system comprising:
a control device configured to:
  determine a type of a service needing to be forwarded by a switch device;
  determine, according to the type of the service needing to be forwarded by the switch device and a prestored correspondence between a service type and flow table matching capability information, flow table matching capability information corresponding to the service type;
  send a flow table configuration message to a switch device, where the flow table configuration message carries the flow table matching capability information corresponding to the service type, so that the switch device configures, according to the flow table matching capability information, a flow table required for the service type; and
a switch device in communication with the control device, wherein the switch device is configured to:
  receive the flow table configuration message sent by the control device;
  configure, according to the flow table matching capability information corresponding to the type of the service needing to be forwarded, the flow table corresponding to the type of the service needing to be forwarded;
  receive a first indication message from the control device, wherein the first indication message carries a flow rule and a type of the flow rule delivered by the control device and information about a target level of the flow table corresponding to the flow rule, wherein the first indication message instructs the switch device to adapt the flow rule to the target level of the flow table and save the adaptation result, wherein the target level of the flow table is a level of the flow table in which the adaptation result is to be saved, and wherein the type of the flow rule comprises one of a precise flow rule and a wildcard flow rule;
  determine, according to the type of the flow rule carried in the first indication message, whether the flow rule is one of the precise flow rule and the wildcard flow rule;
  extract a flow table match field matching the target level of the flow tabled from the flow rule according to a currently configured flow table match field type of the target level of the flow table when the flow rule is the precise flow rule; and re-arrange, according to a storage structure of the target level of the flow table, the flow table match field matching the target level of the flow table, and wherein storing, by the memory, the adaptation result comprises storing, in a portion of the memory corresponding to the target level of the flow table, the flow table match field matching the target level of the flow table and other information of the flow rule correspondingly.

10. A method for configuring a flow table in an OpenFlow network, wherein the method is based on an OpenFlow protocol switch device, and wherein the method comprises:

receiving a flow table configuration message from a control device, wherein the flow table configuration message carries flow table matching capability information corresponding to a type of a service needing to be forwarded by the switch device;

configuring, in the switch device according to the flow table matching capability information corresponding to the type of the service needing to be forwarded by the switch device, the flow table corresponding to the type of the service needing to be forwarded by the switch device;

receiving a first indication message from the control device, wherein the first indication message carries a flow rule and a type of the flow rule delivered by the control device and information about a target level of the flow table corresponding to the flow rule, wherein the first indication message instructs the switch device to adapt the flow rule to the target level of the flow table and save an adaptation result, wherein the target level of the flow table is a level of the flow table in which the adaptation result is to be saved, and wherein the type of the flow rule comprises one of a precise flow rule and a wildcard flow rule;

extracting a flow table match field matching the target level of the flow table from the flow rule according to a currently configured flow table match field type of the target level of the flow table when the flow rule is the wildcard flow rule;

setting a mask for the flow table match field, which does not match the target level of the flow table, in the flow rule; and storing, in a memory corresponding to the target level of the flow table, a flow rule that is obtained after the mask is set for the flow table match field, which does not match the target level of the flow table, in the flow rule.

11. An OpenFlow switch device, wherein the switch device comprises:

a receiver configured to receive a flow table configuration message from a control device, wherein the flow table configuration message carries flow table matching capability information corresponding to a type of a service needing to be forwarded by the switch device;

a memory configured to store an adaptation result; and a processor coupled to the receiver and the memory and configured to configure, in the switch device according to the flow table matching capability information corresponding to the type of the service needing to be forwarded, a flow table corresponding to the type of the service needing to be forwarded by the switch device, wherein the receiver is further configured to receive a first indication message from the control device after the processor configures, in the switch device according to the flow table matching capability information corresponding to the type of the service needing to be forwarded, the flow table corresponding to the type of the service needing to be forwarded by the switch device, wherein the first indication message carries a flow rule and a type of the flow rule delivered by the control device and information about a target level of the flow table corresponding to the flow rule, wherein the first indication message instructs the switch device to adapt the flow rule to the target level of the flow table and save the adaptation result, wherein the target level of the flow table is a level of the flow table in which the adaptation result is to be saved, wherein the type of the flow rule comprises one of a precise flow rule and a wildcard flow rule, and wherein the processor is further configured to:

determine, according to the type of the flow rule carried in the first indication message, whether the flow rule is one of the precise flow rule and the wildcard flow rule;

extract a flow table match field matching the target level of the flow table from the flow rule according to a currently configured flow table match field type of the target level of the flow table when the flow rule is the wildcard flow rule; and set a mask for the flow table match field, which does not match the target level of the flow table, in the flow rule, and wherein storing, by the memory, the adaptation result comprises storing, in a portion of the memory corresponding to the target level of the flow table, a flow rule that is obtained after the mask is set for the flow table match field, which does not match the target level of the flow table, in the flow rule.

* * * * *